(12) United States Patent
Ohtsu et al.

(10) Patent No.: US 12,067,963 B2
(45) Date of Patent: Aug. 20, 2024

(54) SOUNDPROOF STRUCTURE BODY

(71) Applicant: FUJIFILM Corporation, Tokyo (JP)

(72) Inventors: Akihiko Ohtsu, Ashigara-kami-gun (JP); Shinya Hakuta, Ashigara-kami-gun (JP); Yoshihiro Sugawara, Ashigara-kami-gun (JP); Shogo Yamazoe, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 593 days.

(21) Appl. No.: 17/232,770

(22) Filed: Apr. 16, 2021

(65) Prior Publication Data

US 2021/0233506 A1 Jul. 29, 2021

Related U.S. Application Data

(63) Continuation of application No. PCT/JP2019/039356, filed on Oct. 4, 2019.

(30) Foreign Application Priority Data

Oct. 19, 2018 (JP) .................... 2018-197582

(51) Int. Cl.
*G10K 11/172* (2006.01)
*F24F 13/24* (2006.01)
(Continued)

(52) U.S. Cl.
CPC ............ *G10K 11/172* (2013.01); *F24F 13/24* (2013.01); *G10K 11/161* (2013.01); *B60R 13/08* (2013.01)

(58) Field of Classification Search
CPC .... G10K 11/172; G10K 11/16; G10K 11/175; F01N 1/04; F01N 1/02; H01M 8/040482; B01D 53/00; F24F 13/24; F02M 35/10
See application file for complete search history.

(56) References Cited

U.S. PATENT DOCUMENTS 6,782,109 B2 * 8/2004 Sheplak ............... G10K 11/172
381/431
8,439,158 B2 * 5/2013 Tanase ..................... F01N 1/04
181/276
(Continued)

FOREIGN PATENT DOCUMENTS

CN 101826323 A 9/2010
CN 102482964 A 5/2012
(Continued)

OTHER PUBLICATIONS

Arun Arjunan, Acoustic absorption of passive destructive interference cavities, Materials Today Communications, vol. 19, 2019, pp. 68-75, ISSN 2352-4928 (Year: 2019).*
(Continued)

*Primary Examiner* — Dedei K Hammond
*Assistant Examiner* — Joseph James Peter Illicete
(74) *Attorney, Agent, or Firm* — Birch, Stewart, Kolasch & Birch, LLP

(57) ABSTRACT

In a soundproof structure body including a tubular tube body having an opening portion, and a resonance type soundproof structure, in which a phase difference θ, at an upstream of the resonance type soundproof structure, between a reflected wave in the resonance type soundproof structure and a reflected wave of a transmitted wave transmitted through the resonance type soundproof structure and reflected by the opening portion satisfies Inequation |θ−π|≤π/3 with respect to a resonance frequency of the resonance type soundproof structure. This soundproof structure body can effectively offset a reflected wave from a resonance type soundproof structure body by opening end reflection by appropriately specifying positions of the resonance type soundproof structure and the opening end portion of a duct, a tube line, or the
(Continued)

like to improve an absorbance of a single resonance type soundproof structure.

23 Claims, 15 Drawing Sheets

(51) Int. Cl.
    *G10K 11/16*     (2006.01)
    *B60R 13/08*     (2006.01)

(56) References Cited

U.S. PATENT DOCUMENTS

| | | | |
|---|---|---|---|
| 2005/0126850 A1* | 6/2005 | Yamaguchi | F01N 1/089 |
| | | | 181/249 |
| 2007/0163533 A1* | 7/2007 | Nakayama | F02M 35/1283 |
| | | | 123/184.57 |
| 2010/0065369 A1 | 3/2010 | Honji | |
| 2010/0224441 A1 | 9/2010 | Fujimori et al. | |
| 2011/0127107 A1 | 6/2011 | Tanase et al. | |
| 2012/0138384 A1 | 6/2012 | Wakatsuki | |
| 2015/0345497 A1* | 12/2015 | Lucas | F04C 15/0049 |
| | | | 418/205 |
| 2016/0334131 A1* | 11/2016 | Hasegawa | F24F 13/24 |
| 2017/0092255 A1* | 3/2017 | Yakumaru | H01M 8/04395 |

FOREIGN PATENT DOCUMENTS

| | | |
|---|---|---|
| JP | 60-8232 Y2 | 3/1985 |
| JP | 2944552 B2 | 9/1999 |
| JP | 2000-205486 A | 7/2000 |
| JP | 2003-36084 A | 2/2003 |
| JP | 2010-85989 A | 4/2010 |
| JP | 2012-128230 A | 7/2012 |
| JP | 2016-95070 A | 5/2016 |
| JP | 2016-133226 A | 7/2016 |

OTHER PUBLICATIONS

International Preliminary Report on Patentability and Written Opinion of the International Searching Authority for International Application No. PCT/JP2019/039356, dated Apr. 29, 2021, with an English translation.

International Search Report for International Application No. PCT/JP2019/039356, dated Dec. 17, 2019, with an English translation.

Extended European Search Report for European Application No. 19872621.8, dated Nov. 2, 2021.

Chinese Office Action and Search Report for corresponding Chinese Application No. 201980068160.0, dated Oct. 12, 2023, with English translation.

\* cited by examiner

SOUNDPROOF STRUCTURE BODY

CROSS-REFERENCE TO RELATED APPLICATIONS

This application is a Continuation of PCT International Application No. PCT/JP2019/039356 filed on Oct. 4, 2019, which claims priority under 35 U.S.C. § 119(a) to Japanese Patent Application No. 2018-197582 filed on Oct. 19, 2018. The above application is hereby expressly incorporated by reference, in its entirety, into the present application.

BACKGROUND OF THE INVENTION

1. Field of the Invention

The present invention relates to a soundproof structure body capable of realizing high absorption using a resonance type soundproof structure.

2. Description of the Related Art

In the related art, structures such as ducts, tube lines, or the like, which are premised on ensuring air permeability, allow sound together with gas and/or heat to pass. Therefore, noise countermeasures may be required. Thus, in applications for particularly attaching ducts, tube lines, or the like to machines with noise, it is necessary to provide soundproofing in devising the structures of the ducts, the tube lines, or the like.

Here, it is considered to absorb noise in ducts, tube lines, or the like by using a sound absorbing material or the like (see JP1985-008232Y (JP-S60-008232Y)).

In JP1985-008232Y (JP-S60-008232Y), a silencer in which two ventilation ducts made of a sound insulating material are connected to each other by the sound absorbing material having the same cross-sectional area made of glass wool or the like, and the entire circumference of a sound absorbing duct is surrounded by a silencer box lined with the sound absorbing material is disclosed. In this silencer, since the cross-sectional area of the silencer box is larger than the cross-sectional area of the ventilation duct, a part of sound propagating in the ventilation duct, particularly low frequency sound, is transmitted from the sound absorbing duct into the silencer box and then returned to the ventilation duct due to the phenomenon of sound reflection at an opening end, and in particular, attenuation of low frequency sound is enhanced.

Generally, in a case of reducing a peak sound, it is considered as one of the countermeasures to place or attach a resonance type soundproof structure (a resonance body such as a Helmholtz resonator, an air column resonance cylinder, and a film vibration type resonance structure) into a duct, a tube line, or the like, in order to obtain a high transmission loss at a desired frequency.

Here, one resonance type soundproof structure body installed in parallel for an acoustic circuit installed in a duct, a tube line, or the like has an absorbance uniquely determined by acoustic impedance thereof. Therefore, in a case where it is desired to further increase the sound absorbance, a method of disposing a large number of soundproof structures can be considered (see JP2944552B).

A silencer disclosed in JP2944552B has two resonators that resonate in a frequency band to be silenced and that are disposed on an upstream and a downstream respectively, the upstream being an upstream position in a sound propagation direction in an air channel and the downstream being a downstream position in the sound propagation direction in the air channel, in which the two resonators have resonant openings to be opened, respectively, an interval between the resonant openings of the two resonators is an interval in which the resonant opening of the resonator on the upstream faces toward a position at which sound pressure in the frequency band to be silenced increases due to interference between sound propagated from a sound source and sound reflected from the resonator on the downstream, and the resonator on the upstream is a resonator provided with sound absorbability due to a resistance component of an impedance. In addition, the interval L between the resonant opening of the resonator on the upstream and the resonant opening of the resonator on the downstream is set to a value given by Expression $L=(2n-1)\cdot\lambda/4$ (n is a natural number) with respect to a wavelength $\lambda$ of sound at a specific frequency in the frequency band to be silenced.

As a result, in the silencer described in JP2944552B, a high silencing effect even for sound in a low frequency band can be obtained. Furthermore, there is a small increase in ventilation resistance, and the high silencing effect can be stably obtained without receiving an influence of acoustic characteristics on an air channel structure.

SUMMARY OF THE INVENTION

In the silencer disclosed in JP1985-008232Y (JP-S60-008232Y), low frequency sound that is generally difficult to be absorbed even though a sound absorbing material is used can be absorbed. However, it is necessary to use a silencer box having a larger cross-sectional area than a ventilation duct. Therefore, there is a problem that a device configuration is large and the sound cannot be absorbed compactly. In addition, since the silencer disclosed in JP1985-008232Y (JP-S60-008232Y) uses a sound absorbing material to absorb the sound, there is a problem that peak sound cannot be efficiently absorbed in a case where the noise source emits the peak sound.

In the silencer described in JP2944552B, since it is necessary to place an upstream resonator in a place where a sound pressure is high due to an interference between a reflected wave and an incident wave from a downstream resonator, and each of the two upstream and downstream resonators needs to have eight resonant openings in the circumferential direction, there is a problem that this method is not suitable, for example, in a case where there are spatial restrictions. In addition, in the silencer disclosed in JP2944552B, since at least two resonators are required to obtain high absorption, and at least about a quarter of the wavelength of target sound is essential, there is a problem that it is not suitable for miniaturization.

An object of the present invention is to overcome the problems in the related arts, and to provide a soundproof structure body capable of effectively offsetting a reflected wave from a resonance type soundproof structure body and opening end reflection with each other by appropriately specifying positions of the resonance type soundproof structure and an opening end portion of a duct, a tube line, or the like to improve an absorbance of a single resonance type soundproof structure.

In addition to the above described object, another object of the present invention is to provide a soundproof structure body capable of achieving high absorption with a small number of resonance type soundproof structures, and as a result, capable of obtaining high absorption with a small size.

In order to achieve the above described objects, the soundproof structure body of the present invention includes a tubular tube body having an opening portion, and a resonance type soundproof structure, in which a phase difference θ, at an upstream of the resonance type soundproof structure, between a reflected wave in the resonance type soundproof structure and a reflected wave of a transmitted wave transmitted through the resonance type soundproof structure and reflected by the opening portion satisfies the following Inequation (1) with respect to a resonance frequency of the resonance type soundproof structure.

$$|\theta - \pi| \leq \pi/3 \quad (1)$$

Here, an absorbance of the resonance type soundproof structure at a single resonance type soundproof structure in a waveguide having the same thickness as that of the tube body is preferably larger than the reflectance.

In addition, in a case where a waveguide distance from the resonance type soundproof structure to the opening portion of the tube body, which includes an opening end correction, is denoted by L, an average cross-sectional area of a waveguide included in the tube body is denoted by S1, and an opening end reflectance at the opening portion is denoted by Rx(f), an acoustic impedance Z1 defined by Expression (3) preferably satisfies Expression (2) on a complex plane in a frequency range in which a frequency f satisfies $f < c/(4 \times (\sqrt{S1/\pi}))$.

$$|(Z1-Z0)/(Z1+Z0)| < \sqrt{Rx(f)} \quad (2)$$

$$Z1 = (A \times Z0 + B)/(C \times Z0 + D) \quad (3)$$

A, B, C, and D are given by Expression (4) representing a transfer matrix T.

$$T = \begin{pmatrix} A & B \\ C & D \end{pmatrix} = \begin{pmatrix} 1 & 0 \\ \frac{1}{Z_R} & 1 \end{pmatrix} \begin{pmatrix} \cos kL & iZ_0 \sin kL \\ \frac{i}{Z_0} \sin kL & \cos kL \end{pmatrix} \begin{pmatrix} 1 & 0 \\ 0 & \frac{S_X}{S_I} \end{pmatrix} \quad (4)$$

Z0 is given by the following Expression (5).

$$Z0 = \rho c/S1 \quad (5)$$

Sx is given by the following Expression (6).

$$Sx = (1 + Rx(f))/(1 - Rx(f)) \times S1 \quad (6)$$

$Z_R$ is an impedance of the resonance type soundproof structure, c is a speed of sound, ρ is a density of air, and k is a wave number.

It is preferable that an outlet side interface of the tube body is preferably regarded as an open space.

It is preferable that the soundproof structure body further includes at least one resonance type soundproof structure in addition to the resonance type soundproof structure. Therefore, it is preferable to have a plurality of resonance type soundproof structures.

In addition, the resonance type soundproof structure is preferably disposed within λ/4 from the opening portion.

It is preferable that the tube body includes a noise source, and in a case where a resonance frequency of the tube body including the noise source is denoted by fn (n is a resonance frequency, and a positive integer), and a difference between adjacent resonance frequencies of the tube body including the noise source is denoted by Δf, a resonance frequency fr of the resonance type soundproof structure satisfies Expression (7).

$$fn - \Delta f/4 \leq fr \leq fn + \Delta f/4 \quad (7)$$

It is preferable that the resonance frequency fr of the resonance type soundproof structure and the resonance frequency fn of the tube body including the noise source coincide with each other.

It is preferable that the noise source is a fan.

It is preferable that a peak frequency of a noise spectrum of the noise source and the resonance frequency of the resonance type soundproof structure coincide with each other.

It is preferable that the tube body further includes at least one opening portion in addition to the opening portion. Therefore, the tube body preferably includes a plurality of opening portions.

It is preferable that the resonance type soundproof structure is a film resonance body, a Helmholtz resonance body, or an air column resonance body.

According to the present invention, it is possible to effectively offset the reflected wave from the resonance type soundproof structure body and opening end reflection with each other by appropriately specifying positions of the resonance type soundproof structure and the opening end portion of a duct, a tube line, or the like and to improve the absorbance of the single resonance type soundproof structure.

Furthermore, according to the present invention, it is possible to achieve high absorption with a small number of resonance type soundproof structures, and as a result, it is possible to obtain high absorption with a small size.

DESCRIPTION OF THE PREFERRED EMBODIMENTS

Hereinafter, a soundproof structure body according to an embodiment of the present invention will be described in detail with reference to suitable embodiments illustrated in the accompanying diagrams.

The following description of components may be made based on representative embodiments of the present invention, but the present invention is not limited to the embodiments.

In the present specification, the numerical range represented by using "to" means a range including numerical values described before and after "to" as a lower limit value and an upper limit value.

In addition, in the present specification, "orthogonal" and "parallel" include a range of errors accepted in the technical field to which the present invention belongs. For example, "orthogonal" and "parallel" mean that the error is within a range of less than ±10° with respect to strict orthogonality or parallelism, and the error is preferably 5° or less, and more preferably 3° or less with respect to strict orthogonality or parallelism.

In the present specification, "the same" and "similar to" include an error range generally accepted in the technical field. Furthermore, in the present specification, in a case where the terms "all", "any", and "entire surface" are used, the terms shall include not only the case of 100% but also an error range generally accepted in the technical field, for example, 99% or more, 95% or more, or 90% or more.

A soundproof structure body according to an embodiment of the present invention includes a tubular tube body having at least one opening portion, and at least one resonance type soundproof structure, in which a phase difference θ, at an upstream of the resonance type soundproof structure, between a reflected wave in the resonance type soundproof structure and a reflected wave of a transmitted wave transmitted through the resonance type soundproof structure and reflected by the opening portion satisfies Inequation $|\theta - \pi| \leq \lambda/3$ with respect to a resonance frequency of the resonance type soundproof structure.

First, the soundproof structure body according to a first embodiment of the present invention will be described in detail.

(Soundproof Structure Body)

Figure 1:
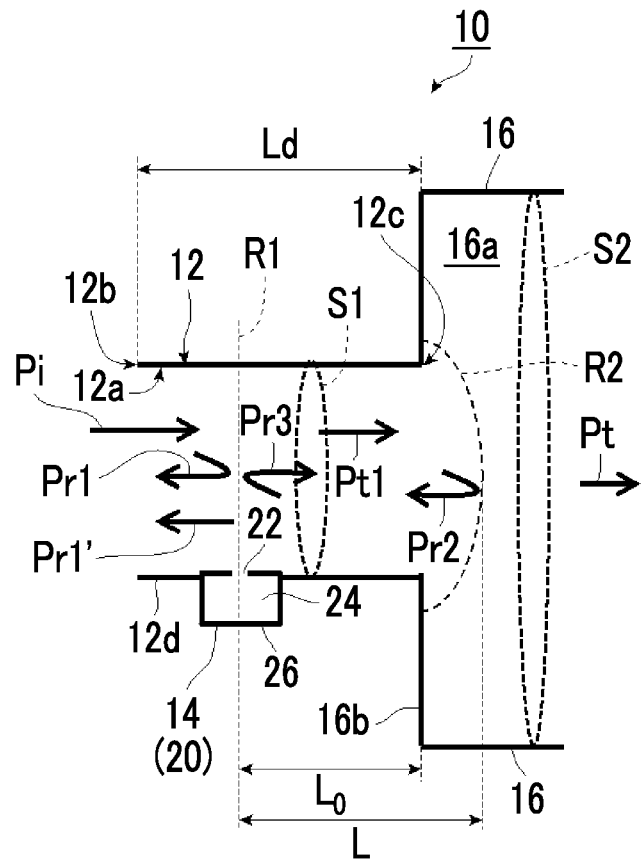
FIG. 1 is a cross-sectional schematic view conceptually illustrating an example of a soundproof structure body according to an embodiment of the present invention.

FIG. 1 is a cross-sectional view schematically showing an example of a soundproof structure body according to a first embodiment of the present invention.

A soundproof structure body 10 illustrated in FIG. 1 includes a cylindrical tubular tube body 12 having a circular cross-section and a resonance structure 14 installed on a wall surface of the tube body 12.

The tube body 12 has an opening tube line 12a, an opening portion 12b on one side, and an opening portion 12c of an opening end on the other side. An end portion of the opening portion 12c on the other side is connected to an end surface 16b of a second cylindrical tubular tube body 16 having a circular cross-section. A cross-sectional area S2 of a circular cross-sectional-shaped tube line 16a of the second tube body 16 is larger than a cross-sectional area S1 of the opening tube line 12a of the tube body 12, in which the opening tube line 12a is formed as a through-hole having a circular cross-section. It is assumed that the opening portion 12b on one side is long at infinity, that is, a system that does not consider the reflection of sound waves from a left end.

Here, at an end portion on one side of the tube line 16a of the second tube body 16, an opening of the end surface 16*b* is connected to the opening portion 12*c* of the tube body 12, and an end portion on the other side is opened. As a result, the opening tube line 12*a* of the tube body 12 communicates with the tube line 16*a* of the second tube body 16, and communicates with an opened space through the tube line 16*a*. Here, the cross-sectional area S2 of the tube line 16*a* of the second tube body 16 can be regarded as much larger than the cross-sectional area S1 of the opening tube line 12*a* of the tube body 12 (S2>>S1), and an outlet side interface of the opening portion 12*c* of the tube body 12 is preferably regarded as an open space.

In the example illustrated in FIG. 1, the second tube body 16 is connected to the opening portion 12*c* of the tube body 12, but the present invention is not limited thereto. Furthermore, the second tube body 16 may not be connected to the second tube body 16, and the opening portion 12*c* of the tube body 12 may be directly opened toward the open space. That is, the outlet side interface of the opening portion 12*c* of the tube body 12 may be the open space.

In the present invention, the cross-sectional area of the opening cross-section of the tube body 12 is defined as an average area of the cross-section of the opening tube line 12*a* from a resonator (resonance structure 14) of the tube body 12, which is perpendicular to a waveguide forward direction (traveling direction of the sound wave), in the tube body 12 to the opening end. In addition, the cross-sectional area of the opening cross-section of the second tube body 16 is defined as an average area of the cross-section of the tube line 16*a* of the second tube body 16, which is perpendicular to the waveguide forward direction (traveling direction of the sound wave), in the tube body 12.

The resonance structure 14 is a resonance type soundproof structure of the present invention, and is installed with an interval $L_0$ from the opening portion 12*c* of the tube body 12 to the inside of the opening tube line 12*a* of the tube body 12.

Figure 2:
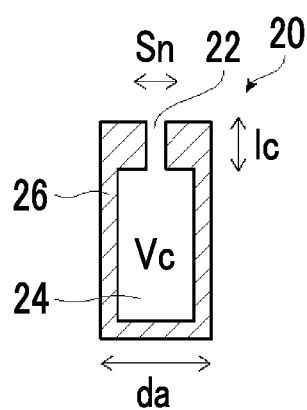
FIG. 2 is a cross-sectional view schematically illustrating a Helmholtz resonance structure used in the soundproof structure body illustrated in FIG. 1.

In addition, the interval $L_0$ between the resonance structure 14 and the opening portion 12*c* of the tube body 12 is defined as a distance between centers of planes on which sound waves are incident in the resonance structure 14. The "centers of planes on which sound waves are incident" correspond to, for example, a center of a resonance hole in a case of a Helmholtz resonance structure, a center of a film surface in a case of a film resonance structure, or a center of a hole portion in a case of an air column resonance structure. In the example illustrated in FIG. 1, the resonance structure 14 is a Helmholtz resonance structure 20 as illustrated in FIG. 2. In addition, in a case where the tube body 12 is not a straight line and the tube body is bent, for example, the interval $L_0$ between the resonance structure 14 and the opening portion 12*c* of the tube body 12 is defined as a plane orthogonal to the waveguide forward direction vector and a length of a line segment formed by connecting centroid positions of the cross-sectional shapes at each cross-sectional position from the centroid of the waveguide cross-sectional shape of a plane passing through the center of the sound wave incident surface in the resonance structure 14 to the centroid of the cross-sectional shape of the opening portion 12*c*.

Although in the soundproof structure body 10 illustrated in FIG. 1, one resonance structure 14 is installed in the opening tube line 12*a* in the tube body 12, the present invention is not limited thereto, and two or more resonance structures 14 may be installed. Even in a case where two or more resonance structures 14 are installed, at least one resonance structure 14 is necessary to be installed with the interval $L_0$ from the opening portion 12*c* of the tube body 12 toward the opening tube line 12*a* of the tube body 12 such as the one resonance structure 14 as illustrated in FIG. 1, and necessary to satisfy requirements of the present invention described later. Here, in a case where a wavelength of resonance is denoted by λ, it is preferable that the interval $L_0$ is $L0 \leq \lambda/4$. That is, the resonance structure 14 is preferably disposed within λ/4 from the opening portion 12*c* of the tube body 12.

In making a determination of the wavelength λ of the resonance, in a case where in an acoustic tube having the same opening area as the tube body 12, a frequency at which a maximum absorbance measured by a measurement method using four-microphones is obtained is denoted by f, a wavelength of the resonance is defined as λ=c/f.

Soundproofing targets to which the soundproof structure body 10 according to the embodiment of the present invention is applied for soundproofing is not particularly limited and may be any object, and examples thereof can include a copying machine, a blower, an air conditioning machine, a ventilator, pumps, a generator, and a duct, industrial equipment, for example, various kinds of manufacturing devices emitting a sound such as a coater, a rotating machine, and a carrier machine, transportation equipment such as an automobile, an electric train, and an aircraft, and general household equipment such as a refrigerator, a washing machine, a dryer, a television, a copier, a microwave, a game machine, an air conditioner, a fan, a personal computer, a vacuum cleaner, and an air cleaner.

(Tube Body)

Here, although the tube body 12 is a tube body formed in a region of an object that blocks the passage of gas, a tube wall of the tube body 12 forms a wall of an object that blocks the passage of gas, for example, an object separating two spaces from each other, and the like, and an inside of the tube body 12 is formed with the opening tube line 12*a* formed in a region of a part of the object that blocks the passage of gas.

It can be said that the opening cross-section is a cross-section of the opening tube line 12*a* of the tube body 12 orthogonal to an axial direction of the tube body 12. Since a sound wave traveling in the tube body 12 travels along the axial direction of the tube body 12, it can be said that the opening cross-section is a cross-section of the opening tube line 12*a* of the tube body 12 perpendicular to the waveguide forward direction (the traveling direction of the sound wave). The opening tube line 12*a* of the tube body 12 is preferably a straight tube line, but may be curved. In addition, it is preferable that the opening cross-section of the opening tube line 12*a* of the tube body 12 is the same along the central axis direction, but expansion and contraction may occur.

Here, the tube body 12 includes the opening portion 12*c* at the end portion of the opening tube line 12*a* on the other side, but may further include an opening portion.

In the present invention, the tube body has an opening formed in the region of the object that blocks the passage of gas, and it is preferable that the opening member is provided in a wall separating two spaces from each other.

Here, the object that has a region where an opening such as the opening tube line is formed and that blocks the passage of gas refers to a member, a wall, or the like separating two spaces from each other. The member refers to a member, such as a tube body and a cylindrical body, such as a duct or a sleeve. The wall refers to, for example, a fixed wall forming a building structure such as a house, a building, or a factory, a fixed wall such as a fixed partition disposed in a room of a building to partition the inside of the room, or a movable wall such as a movable partition disposed in a room of a building to partition the inside of the room.

The tube body of the present invention may be a tube body or a cylindrical body, such as a duct or a sleeve, may be a wall itself having an opening for attaching a ventilation hole, such as a louver or a gully, or a window, or may be a mounting frame, such as a window frame attached to a wall.

Although a shape of an opening of the tube body of the present invention is a circle in a cross-sectional shape in an illustrated example, in the present invention, the shape of the opening of the opening member is not particularly limited as long as the resonance structures can be disposed in the wall surface of the tube body. For example, the shape of the opening of the opening member may be a quadrangle such as a square, a rectangle, a diamond, or a parallelogram, a triangle such as an equilateral triangle, an isosceles triangle, or a right triangle, a polygon including a regular polygon such as a regular pentagon or a regular hexagon, an ellipse, and the like, or may be an irregular shape.

A size of the tube body is not particularly limited and may be an appropriate size according to an application of the tube body. For example, in a case where a wavelength of a sound wave at a frequency to be absorbed is denoted by k, an area S of the opening cross-section preferably satisfies $S<\pi(\lambda/2)^2$. This is because that at the frequency where this condition is not satisfied, a spatial mode (transverse mode) is formed in a tube line cross-sectional direction and thus a plane wave is not maintained.

Materials of the tube body of the present invention are not particularly limited, and examples of the materials include metal materials such as aluminum, titanium, magnesium, tungsten, iron, steel, chromium, chromium molybdenum, nichrome molybdenum, and alloys thereof, resin materials such as acrylic resins, polymethyl methacrylate, polycarbonate, polyamideimide, polyarylate, polyether imide, polyacetal, polyether ether ketone, polyphenylene sulfide, polysulfone, polyethylene terephthalate, polybutylene terephthalate, polyimide, and triacetyl cellulose, carbon fiber reinforced plastics (CFRP), carbon fiber, glass fiber reinforced plastics (GFRP), and wall materials such as concrete similar to the wall material of buildings and mortar.

Next, the resonance structure according to the present invention will be described.

(Resonance Structure)

The resonance structure 14 illustrated in FIG. 1 is a Helmholtz resonance structure 20 that resonates with respect to a sound wave.

As illustrated in FIGS. 1 and 2, the Helmholtz resonance structure 20 is a resonance body including a housing 26 with a resonance hole 22 that communicates with the outside, and a hollow space 24 therein, and is referred to as a Helmholtz resonator.

Here, the Helmholtz resonance structure 20 has the hollow space 24 that serves as the resonance space in the housing 26. The resonance hole 22 is provided to have a predetermined length on an upper portion of the housing 26, and the hollow space 24 inside the housing 26 and the outside are communicated through the resonance hole 22.

In addition, in the examples illustrated in FIG. 1 and FIG. 2, the housing 26 has a rectangular parallelepiped shape in a plan view, and the hollow space 24 that is a resonance space also has a rectangular parallelepiped shape in a plan view. A shape of the housing 26 may be any shape as long as the hollow space 24 can be formed therein and the Helmholtz resonance structure 20 can be disposed on the wall surface of the tube body 12. For example, in the present invention, a cross-sectional shape of the housing 26 is not particularly limited. The shape is, for example, a planar shape, and may be a quadrangle such as a square, a rectangle, a diamond, or a parallelogram, a triangle such as an equilateral triangle, an isosceles triangle, or a right triangle, a polygon including a regular polygon such as a regular pentagon or a regular hexagon, or a circle or an ellipse, and the like, or may be an irregular shape.

A shape of the hollow space 24 is not particularly limited and is preferably the same as the shape of the housing 26, but may be a different shape.

Materials of the housing 26 are preferably hard materials, but are not particularly limited. The materials of the housing 26 are not particularly limited as long as materials have a strength suitable in a case of being applied to the above described soundproofing targets and are resistant to a soundproof environment of the soundproofing targets, and can be selected in accordance with the soundproofing targets and the soundproof environment thereof. Examples of the materials of the housing 26 include metal materials such as aluminum, titanium, magnesium, tungsten, iron, steel, chromium, chromium molybdenum, nichrome molybdenum, and alloys thereof, resin materials such as acrylic resins, polymethyl methacrylate, polycarbonate, polyamideimide, polyarylate, polyetherimide, polyacetal, polyether ether ketone, polyphenylene sulfide, polysulfone, polyethylene terephthalate, polybutylene terephthalate, polyimide, and triacetyl cellulose, carbon fiber reinforced plastic (CFRP), carbon fiber, and glass fiber reinforced plastic (GFRP).

In addition, as the materials of the housing 26, these plural kinds of materials may be used in combination.

A conventionally known sound absorbing material may be disposed in the hollow space 24 of the housing 26.

A size of the housing 26 (in a plan view) can be defined as a size between outer surfaces of the housing 26, but is not particularly limited. The size of the housing 26 can be represented by, for example, a width da along the waveguide forward direction and an area Sh (height×depth) of a side surface orthogonal to the waveguide forward direction in a case where the housing 26 has a rectangular parallelepiped shape and the Helmholtz resonance structure 20 is installed on a wall surface of the tube body 12.

Here, the width da of the housing 26 preferably satisfies $\lambda/2 \leq da$, and more preferably $\lambda/4 \leq da$, where $\lambda$ is a wavelength corresponding to a resonance frequency of the housing 26.

The area Sh of the side surface of the housing 26 is preferably 1% to 99% of the opening cross-section of the tube body 12, and more preferably 5% to 50%.

The housing 26 forming the Helmholtz resonance structure 20 can be manufactured by bonding or fixing an upper portion of the housing having the resonance hole 22 to an upper surface of a housing main body formed of a bottomed frame forming the hollow space 24 using a fixture.

The resonance hole 22 preferably has a circular cross-section, but is not particularly limited, and a cross-sectional shape thereof may have a polygonal shape such as a square.

A cross-sectional size (cross-sectional area) Sn and an axial length lc of the resonance hole 22 are not particularly limited, and are parameters that determine a resonance frequency of the Helmholtz resonance structure 20. Thus, the cross-sectional size Sn and the axial length 1 of the resonance hole 22 can be determined according to a resonance frequency to be required.

Here, an impedance Z of the Helmholtz resonance structure 20 is given by Expression (8) with reference to Fundamentals of Physical Acoustics, Wiley-Interscience (2000).

$$Z = \frac{z_{air}k^2}{2\pi} + i\left(\frac{Cklc}{S_n} - \frac{z_{air}C}{kV_C}\right) \quad (8)$$

ρ denotes a density of air (for example, 1.205 kg/m² (room temperature (20°))) and C denotes a speed of sound (343 m/sec). k denotes a wave number (k=2π/λ, =2πC/f: λ wavelength, f: frequency). Sn denotes a cross-sectional area perpendicular to an axial direction of the resonance hole 22 (a cross-sectional area of the neck of the Helmholtz), le denotes an axial length of the resonance hole 22 (a length of the neck of the Helmholtz), and Vc denotes a volume of the hollow space (an internal space of the Helmholtz) 24 that serves as a resonance space of the housing 26.

Since the sound cannot enter the Helmholtz resonance structure 20 in a case where a shape of the resonance hole 22 of the Helmholtz resonance structure 20 and/or an air layer of the hollow space 24 on the back surface is extremely elongated, the above Expression (8) may not be established.

However, even in such a case, an experimental value or a simulation value of the impedance Z can be obtained by the following Expression (12) based on a reflection coefficient obtained by an experiment (measurement using four-microphones in an acoustic tube) or a simulation.

$$Z=-(1+r)Z0/2r \quad (12)$$

Therefore, in a case where the above Expression (8) does not established, the experimental value or the simulation value may be obtained by the above Expression (12).

In the case of the Helmholtz resonance structure 20 and the film resonance structure 30 described later, the impedance Z value can also be obtained by the above Theoretical Expression (8) and Theoretical Expression (10) described later, respectively. In a case where there is a discrepancy between a theoretical value, an experimental value, and a simulation value, any value in a range between the theoretical value, the experimental value, and the simulation value can be adopted as an impedance value.

Upon the Helmholtz resonance structure 20, the above Expression (8) may not be established depending on the shape of the resonance hole 22, and/or the shape of the hollow space 24 on the back surface.

However, an experimental value or a simulation value of the impedance Z can be obtained based on the reflection coefficient obtained by the experiment (measurement using four-microphones in an acoustic tube) or the simulation.

Figure 29:
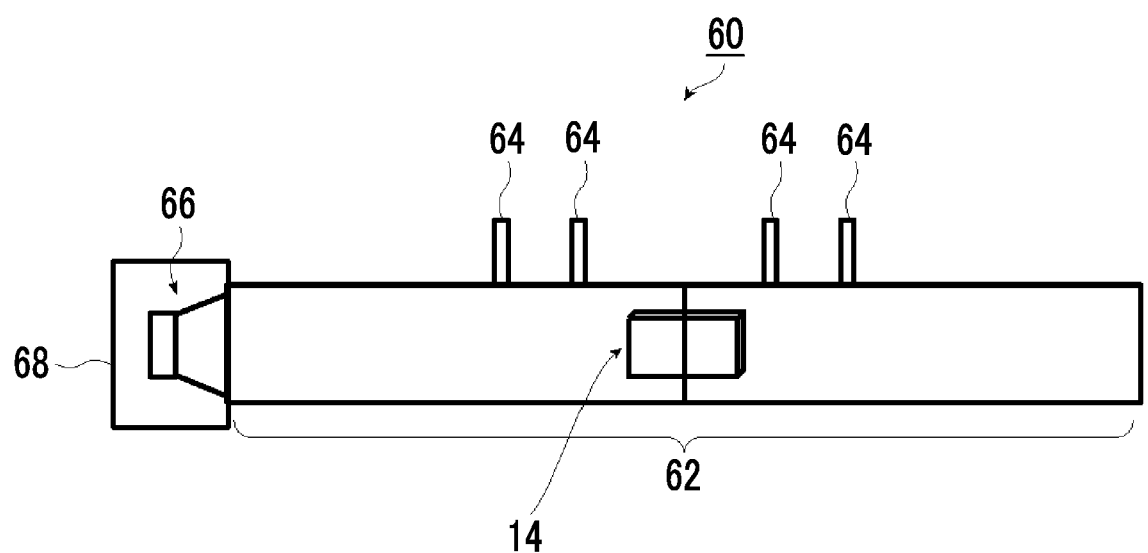
FIG. 29 is a schematic view of an acoustic characteristic measurement system for carrying out a measurement method using four-microphones in an acoustic tube.

For example, in order to obtain the impedance Z in the experiment, measurement is performed by a transfer function method using four-microphones 64 on an aluminum acoustic tube (tube body 62) in the same manner as in an acoustic characteristic measurement system 60 illustrated in FIG. 29. This method complies with "ASTM E2611-09: Standard Test Method for Measurement of Normal Incidence Sound Transmission of Acoustical Materials Based on the Transfer Matrix Method". As the acoustic tube, an aluminum tube body is used as, for example, an acoustic tube having the same measurement principle as WinZac manufactured by Nihon Onkyo Engineering Co., Ltd. (regarding WinZac, refer to the web document "https://www-.noe.co.jp/en/download/pdf/winzac.pdf"). Here, the cross-sectional area of the acoustic tube is set to have the same cross-sectional area as that of the tube body 62, a cylindrical box 68 containing a speaker therein is disposed on the lower side of the tube body 62, and the tube body 62 is placed on the box 68. Sound with a predetermined sound pressure was output from a speaker 66, and measurement was performed with four-microphones 64.

For example, the reflection coefficient r (described as R in the document) described above can be obtained by Expression (A1-45c) of P22 in the above web document that describes the principle of WinZac. Here, during the measurement, a position of the cross-section, which passes through the centroid of the sound wave incident surface of the structure body and is perpendicular to a traveling direction of sound wave in the acoustic tube, is set to x=0.

On the other hand, also in the simulation, the reflection coefficient r in a case where a plane wave is incident from one end of the acoustic tube having the same cross-sectional area as the tube body 62 can be calculated. For example, in a case where an incident sound pressure wave on the incident surface is pi, a reflected sound pressure wave is pr, a distance between the incident surface and the sound pressure wave incident surface of the resonance structure body is L, and the wave number is k (=2π/λ)), the reflection coefficient r can be calculated by r=pr*exp(i*2kL)/pi.

The acoustic impedance Z1 can be represented by the following Expression (13-1) using the reflection coefficient r.

$$Z1=Z0*(1+r)/(1-r) \quad (13-1)$$

On the other hand, the acoustic impedance Z1 can be represented by the following Expression (13-2) using the impedance Z of the resonance body.

$$Z=Z*Z0/(Z+Z0) \quad (13-2)$$

Here, since Z1 can be eliminated from the above Expressions (13-1) and (13-2) to obtain the above Expression (12), Z can be determined using Z0, which is uniquely determined from the experimentally obtained reflection coefficient r and the cross-sectional shape of the waveguide of the acoustic tube. The Z obtained by the above Expression (12) is synonymous with the impedance $Z_R$ of the resonance type soundproof structure in the above Expression (4).

Therefore, in a case where the above Expression (8) does not established, an impedance can be obtained by the above method as well. As described above, in a case of the Helmholtz resonance structure and the film resonance structure described later, a value of the impedance Z can also be obtained by the above Theoretical Expression (8) and Theoretical Expression (10) described later, respectively. Furthermore, as described above, in a case where there is a discrepancy between a theoretical value and an experimental value, any value in a range between the theoretical value and the experimental value can be adopted as the impedance Z value.

For example, in a case where the theoretical value, the experimental value, and the simulation value deviate from one another, a value within the deviation range can be used as the impedance Z value of the resonance body. Specifically, in a case where impedances that can be obtained from the theory, experiment, and simulation are denoted by Zt, Ze, and Zs, respectively, Z that satisfies both Inequations of the following Expressions (A) and (B) can be used as an impedance of the resonance body of the present invention.

min(real(Zt),real(Ze),real(Zs))≤real(Z)≤max(real(Zt), real(Ze),real(Zs))  (A)

min(imag(Zt),imag(Ze),imag(Zs))≤imag(Z)≤max (imag(Zt),imag(Ze),imag (Zs))  (B)

real(Z) and imag(Z) represent the real part and the imaginary part of the complex number Z, respectively.

In addition, in a case where C denotes the speed of sound, Sn denotes the cross-sectional area perpendicular to the axial direction of the resonance hole 22, lc denotes the axial length of the resonance hole 22 (a value obtained from an opening end correction), and Vc denotes a volume of the hollow space 24 that serves as the resonance space of the housing 26, a Helmholtz resonance frequency fh is given by Expression (9).

$$fh=(C/2\pi)\cdot\{Sn/(lc\cdot Vc)\}^{1/2} \quad (9)$$

Therefore, in a case where the required Helmholtz resonance frequency fh is determined, the cross-sectional area Sn of the resonance hole 22, the length lc of the resonance hole 22, and the volume Vc of the hollow space 24 of the housing 26 may be selected appropriately to satisfy Expression (9).

The soundproof structure body 10 illustrated in FIG. 1 uses the Helmholtz resonance structure 20 as the resonance structure 14, but the present invention is not limited thereto, and any resonance structures may be used. For example, a film resonance structure 30 shown in FIG. 3 may be used as the resonance structure 14 instead of the Helmholtz resonance structure 20, and an air column resonance structure 40 shown in FIG. 4 may be used. In a case of using a plurality of resonance structures 14, more than one of each of a Helmholtz resonance structure 20 shown in FIG. 2, a film resonance structure 30 shown in FIG. 3, and an air column resonance structure 40 shown in FIG. 4 may be used alone, and may be used in combination.

Figure 3:
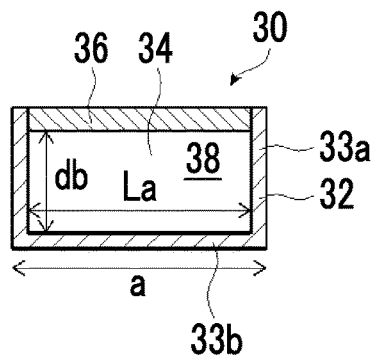
FIG. 3 is a cross-sectional view schematically illustrating an example of a film resonance structure used in a soundproof structure body according to another embodiment of the present invention.

The film resonance structure 30 illustrated in FIG. 3 includes a frame 32 and a film 36 fixed to one end of the frame 32 to cover an opening of a hole portion 34 of the frame 32, and a back space 38 of the film 36 is formed with the frame 32 and the film 36.

In the soundproof structure body 10 according to the embodiment of the present invention, the plurality of film resonance structures 30 are installed respectively so that each of the films 36 thereof is disposed on the wall surface of the tube body 12.

The frame 32 is a bottomed frame formed with a surrounding portion 33a surrounding the hole portion 34 and a bottom portion 33b facing one opening of the hole portion 34.

The frame 32 is used for fixing and supporting the film 36 to cover the hole portion 34, and serves as a node of film vibration of the film 36 fixed to the frame 32. Therefore, the frame 32 has higher stiffness than the film 36, and specifically, both the high mass and the high stiffness per unit area are preferable.

The frame 32 illustrated in FIG. 3 is a bottomed frame that includes a bottom portion 33b and that is provided with a hole portion 34 having an opening of which only one side is opened, but the present invention is not limited thereto, and the frame 32 may be a frame that includes only the surrounding portion 33a provided with the hole portion 34 having an opening of which both sides are opened. In a case of the frame including only the surrounding portion 33a, the other opening may have the same film as the film 36, or may have a back plate made of the same material as the frame material.

It is preferable that the frame 32 has a blocked continuous shape capable of fixing the film 36 to restrain the entire periphery of the film 36, but the present invention is not limited thereto. In addition, the frame 32 may be made to have a discontinuous shape by cutting a part thereof as long as the frame 32 serves as a node of film vibration of the film 36 fixed to the frame 32. That is, since the role of the frame 32 is to fix and support the film 36 to control the film vibration, the effect is achieved even though there are small cuts in the frame 32 or even though there are unbonded parts.

The shape of the hole portion 34 of the frame 32 is preferably a planar shape and a square, but in the present invention, the shape of the hole portion 34 is not particularly limited. For example, the shape of the hole portion 34 may be a quadrangle such as a rectangle, a diamond, or a parallelogram, a triangle such as an equilateral triangle, an isosceles triangle, or a right triangle, a polygon including a regular polygon such as a regular pentagon or a regular hexagon, or a circle or an ellipse, and the like, or may be an irregular shape. End portions of the hole portion 34 of the frame 32 are not blocked but opened to the outside as they are. The film 36 is fixed to the frame 32 to cover the hole portion 34 in the opened end portions of the hole portion 34.

Although the end portions of the hole portion 34 of the frame 32 are not blocked but opened to the outside as they are in FIG. 3, both end portions of the hole portion 34 are opened to the outside and one end portion may be blocked by a member such as the back plate.

A size a of the frame 32 is a size in a plan view, and can be defined as a size La obtained by adding widths of both sides of the frame 32 to the size of the hole portion 34. However, since the widths of both sides of the frame 32 are small, the size a can also be the size La (≈a) of the hole portion 34. In a case where the shape of the frame 32 is a circle or a regular polygonal shape such as a square, the size a of the frame 32 can be defined as a distance between opposite sides passing through a center thereof or as a circle equivalent diameter, and in a case of a polygon, an ellipse, or an irregular shape, the size of the frame 32 can be defined as a circle equivalent diameter. In the present invention, a circle equivalent diameter and a radius are a diameter and a radius in terms of circles having the same area, respectively.

The size a of the frame 32 is not particularly limited, and may be set according to the above described soundproofing target to which the soundproof structure body 10 according to the embodiment of the present invention is applied for soundproofing.

For example, the size a of the frame 32 is not particularly limited, and for example, the size a of the frame 32 is preferably 0.5 mm to 300 mm, more preferably 1 mm to 100 mm, and most preferably 10 mm to 50 mm.

Here, a thickness of the frame 32 can be referred to as a thickness of the surrounding portion 33a and can be defined as a depth db of the hole portion 34 of the frame 32. Therefore, in the following, the depth db of the hole portion 34 will be used.

The thickness of the frame 32, that is, the depth db of the hole portion 34 is not particularly limited. In addition, since the depth db affects the resonance frequency of vibration of the film 36, the depth db may be set according to a resonance frequency, and for example, may be set according to the size La of the hole portion 34.

The depth db of the hole portion 34 is preferably 0.5 mm to 200 mm, more preferably 0.7 mm to 100 mm, and most preferably 1 mm to 50 mm.

The width of the frame 32 can be referred to as the thickness of the member forming the frame 32, but the width of the frame 32 is not particularly limited as long as the film 36 can be fixed and the film 36 can be reliably supported. The width of the frame 32 can be set, for example, according to the size a of the frame 32. Here, the thickness of the bottom portion 33b of the frame 32 can be defined similarly to the width of the frame 32.

For example, in a case where the size a of the frame 32 is 0.5 mm to 50 mm, the width of the frame 32 is preferably 0.5 mm to 20 mm, more preferably 0.7 mm to 10 mm, and most preferably 1 mm to 5 mm.

In addition, in a case where the size a of the frame 32 is more than 50 mm and 300 mm or less, the width of the frame 32 is preferably 1 mm to 100 mm, more preferably 3 mm to 50 mm, and most preferably 5 mm to 20 mm.

In a case where a ratio of the width of the frame 32 to the size a of the frame 32 is too large, an area ratio of the frame 32 portion occupying the entire area increases, and there is concern that weight of the device (the resonance structure 14) increases. On the other hand, in a case where the ratio is too small, it is difficult to strongly fix the film 36 at the frame 32 portion with an adhesive or the like.

Materials of the frame 32 are not particularly limited as long as materials can support the film 36, have a strength suitable in a case of being applied to the above described soundproofing targets, and are resistant to a soundproof environment of the soundproofing targets, and the materials can be selected in accordance with the soundproofing targets and the soundproof environment thereof. For example, as the materials of the frame 32, the same materials as the materials of the housing 26 can be used.

In addition, as the materials of the frame 32, these plural kinds of materials may be used in combination.

A conventionally known sound absorbing material may be disposed in the hole portion 34 of the frame 32.

The sound absorbing material is disposed, whereby sound insulating properties can be further improved by the sound absorbing effect of the sound absorbing material. In addition, the sound absorbing material is not particularly limited, and various known sound absorbing materials such as a urethane plate and a nonwoven fabric can be used. The same applies in a case where the sound absorbing material is disposed in the hollow space 24 of the housing 26 the Helmholtz resonance structure 20.

As described above, a known sound absorbing material is used in combination within the resonance structure 14 (the Helmholtz resonance structure 20, the film resonance structure 30) of the present invention or together with the resonance structure 14, whereby both the sound absorbing effect of the resonance structure 14 of the present invention and the sound absorbing effect of the known sound absorbing material can be obtained.

The film 36 covers the hole portion 34 inside the frame 32 and is fixed to the frame 32 to be restrained. Furthermore, the film 36 absorbs energy of sound waves or reflects sound waves by vibrating in response to sound waves from the outside to insulate sound. That is, it can be said that a film resonance body is formed with the frame 32 and the film 36.

Since the film 36 needs to vibrate with the frame 32 as a node, it is necessary that the film 36 is fixed to the frame 32 to be reliably restrained and absorbs or reflects the energy of sound waves to insulate sound. Thus, it is preferable that the film 36 is formed of a flexible elastic material.

Therefore, the film 36 has an exterior shape in which the width of the frame 32 (width of the surrounding portion 33a) of the outer side of the hole portion 34 is added to the shape of the hole portion 34 of the frame 32.

In addition, since the film 36 needs to be reliably fixed to the frame 32 and to function as a vibrating film, it is necessary that a size (of the exterior shape) of the film 36 is larger than the size La of the hole portion 34. The size (of the exterior shape) of the film 36 may be larger than the size a of the frame 32, which is obtained by adding the widths of the surrounding portion 33a of the frame 32 on both sides of the hole portion 34 to the size La of the hole portion 34, but this larger portion does not have a function as a vibrating film and does not have a function of fixing the film 36. Thus, the size of the film 36 is preferably equal to or smaller than the size a of the frame 32.

In addition, the thickness of the film 36 is not particularly limited as long as the film can vibrate by absorbing the energy of sound waves to insulate sound, but it is preferable to make the film 36 thick in order to obtain a vibration mode with the largest oscillation on a high frequency side, and thin in order to obtain the vibration mode on a low frequency side. For example, in the present invention, the thickness of the film 36 illustrated in FIG. 3 can be set in accordance with the size a of the frame 32 or the size La of the hole portion 34, that is, the size of the film 36.

For example, in a case where the size La of the hole portion 34 is 0.5 mm to 50 mm, the thickness of the film 36 is preferably 0.001 mm (1 µm) to 5 mm, more preferably 0.005 mm (5 µm) to 2 mm, and most preferably 0.01 mm (10 µm) to 1 mm.

In addition, in a case where the size La of the hole portion 34 is more than 50 mm and 300 mm or less, the thickness of the film 36 is preferably 0.01 mm (10 µm) to 20 mm, more preferably 0.02 mm (20 µm) to 10 mm, and most preferably 0.05 mm (50 µm) to 5 mm.

The thickness of the film 36 is preferably represented by an average thickness in a case where one film 36 has various thicknesses.

Here, an impedance Z of the film resonance structure 30 is given by Expression (10) with reference to J. Sound Vib. (1969)10(3), 411-423, and Proceedings of the 22th International Congress on Sound and Vibration (Florence, Italy 12-16 Jul. 2015), LOW-FREQUENCY SOUND ABSORPTION USING A FLEXIBLE THIN METAL PLATE AND A LAYER OF POLYURETHANE FOAM (1258).

$$Z = \frac{B_i D g}{a^4 \omega} + i\left(\rho_s \omega A_i - \frac{B_i D}{a^4 \omega} - \cot(kd)\right) \quad (10)$$

Here, D is a bending stiffness of the film 36 and is given by Expression (11).

$$D = \frac{Eh^3}{12(1 - \sigma^2)} \quad (11)$$

Here, ω denotes an angular frequency, a denotes a length of one side of the frame 32, Ai and Bi (i=1, 2, ...) denote impedance constants of the film 36, E denotes a Young's modulus of the film 36, σ denotes Poisson's ratio of the film 36, h denotes a thickness of the film 36, g denotes a damping constant, and $\rho_s$ denotes an areal density of the film 36.

Here, in a case where the film 36 is a square-shaped film, Ai and Bi have been determined, and the following values can be used from the literature.

$$Ai=2.02, Bi=2.64\times10^3$$

The damping constant is determined empirically, and for example, a value of g=0.04 can be used. In addition, dc is a length of a back air layer.

In a case of a polygonal film such as a rectangle, a circular film, an elliptical film, or the like, an impedance constants Ai and Bi (i=1, 2, ...) of the film 36 changes according to the above shapes, so that values illustrated in a literature or the like can be used.

Upon the film resonance structure 30, the above Expression (10) may not be established depending on the shape and thickness of the film 36, and/or the shape of the back space 38.

In such a case, as described above, an experimental value or a simulation value of the impedance Z can be obtained by the following Expression (12) based on the reflection coefficient obtained by the experiment (measurement using four-microphones in an acoustic tube) or the simulation. As described above, in a case where there is a discrepancy between a theoretical value, an experimental value, and a simulation value, any value in a range between the theoretical value, the experimental value, and the simulation value can be adopted as the impedance value Z.

The film 36 fixed to the frame 32 of the film resonance structure 30 that is the resonance structure 14 of the present invention has the lowest-order resonance frequency (a first resonance frequency) which is a frequency of the lowest-order (first-order) vibration mode that can be induced in the structure of the resonance structure 14.

In addition, in the resonance structure 14 which is the film resonance structure 30 including the frame 32 and the film 36, that is, with respect to the film 36 fixed to the frame 32 to be restrained, the resonance frequency in a case where the sound wave is incident in parallel to the film surface is a frequency at which sound is drawn to the resonance structure side at the frequency at which the sound wave most disturbs film vibration, and the largest absorption peak appears (that is, a maximum absorbance is obtained). Furthermore, the lowest-order resonance frequency is the first resonance frequency which is determined by the film resonance structure 30 including the frame 32 and the film 36 and at which the vibration mode having the lowest-order film vibration is exhibited.

The lowest-order resonance frequency of the film 36 fixed to the frame 32 (for example, a boundary between a frequency region complying with the stiffness law and a frequency region complying with the mass law is the lowest-order first resonance frequency) is preferably 10 Hz to 100000 Hz corresponding to the sound wave sensing range of a human being, more preferably 20 Hz to 20000 Hz that is an audible range of sound waves of a human being, even more preferably 40 Hz to 16000 Hz, and most preferably 100 Hz to 12000 Hz.

Here, in the film resonance structure 30 that is the resonance structure 14 of the present invention, the resonance frequency of the film 36 in the structure including the frame 32 and the film 36, for example, the lowest-order resonance frequency can be determined by the geometric form of the frame 32 of the resonance structure 14, for example, the shape and size of the frame 32, and the stiffness of the film 36 of the resonance structure 14, for example, the thickness and flexibility of the film 36 and the volume of the back space 38 of the film 36.

For example, as a parameter characterizing the vibration mode of the film 36, in a case of the film 36 formed of the same material, a ratio of the size (La) squared of the hole portion 34 to the thickness (t) of the film 36, for example, in a case of a square, a ratio $[La^2/t]$ to the size of one side can be used, and in a case of the ratio $[La^2/t]$ is equal, the vibration mode has the same frequency, that is, the same resonance frequency. That is, by setting the ratio $[La^2/t]$ to a certain value, the scale law is established, and thus an appropriate size can be selected.

The Young's modulus of the film 36 is not particularly limited as long as the film 36 has elasticity capable of performing film vibration in order to insulate sound by absorbing or reflecting the energy of sound waves, and it is preferable that the Young's modulus of the film 36 is large in order to obtain the vibration mode of the film 36 on the high frequency side and is small in order to obtain the vibration mode on the low frequency side. For example, the Young's modulus of the film 36 can be set according to the size of the frame 32 (the hole portion 34), that is, the size of the film in the present invention.

For example, the Young's modulus of the film 36 is preferably 1000 Pa to 3000 GPa, more preferably 10000 Pa to 2000 GPa, and most preferably 1 MPa to 1000 GPa.

The density of the film 36 is not particularly limited as long as the film 36 can perform the film vibration by absorbing or reflecting the energy of sound waves to insulate sound, and for example, the density of the film 36 is preferably 5 kg/m$^3$ to 30000 kg/m$^3$, more preferably 10 kg/m$^3$ to 20000 kg/m$^3$, and most preferably 100 kg/m$^3$ to 10000 kg/m$^3$.

In a case where a film-shaped material or a foil-shaped material is used as a material of the film 36, the material of the film 36 is not particularly limited as long as the material has a strength in a case of being applied to the above soundproofing target and is resistant to the soundproof environment of the soundproofing target, and the film 36 can perform the film vibration by absorbing or reflecting the energy of sound waves to insulate sound. The material can be selected according to the soundproofing target, the soundproof environment, and the like. Examples of the material of the film 36 include resin materials that can be made into a film shape such as polyethylene terephthalate (PET), polyimide, polymethylmethacrylate, polycarbonate, acrylic (PMMA), polyamideimide, polyarylate, polyetherimide, polyacetal, polyetheretherketone, polyphenylene sulfide, polysulfone, polybutylene terephthalate, triacetyl cellulose, polyvinylidene chloride, low density polyethylene, high density polyethylene, aromatic polyamide, silicone resin, ethylene ethyl acrylate, vinyl acetate copolymer, polyethylene, chlorinated polyethylene, polyvinyl chloride, polymethyl pentene, and polybutene, metal materials that can be made into a foil shape such as aluminum, chromium, titanium, stainless steel, nickel, tin, niobium, tantalum, molybdenum, zirconium, gold, silver, platinum, palladium, iron, copper, and permalloy, fibrous materials such as paper and cellulose, and materials or structures capable of forming a thin structure such as a nonwoven fabric, a film containing nano-sized fiber, porous materials including thinly processed urethane or synthrate, and carbon materials processed into a thin film structure.

In addition, the film 36 is fixed to the frame 32 to cover an opening of the hole portion 34 of the frame 32.

The method of fixing the film 36 to the frame 32 is not particularly limited, and any methods may be used as long as the film 36 can be fixed to the frame 32 to serve as a node of film vibration. Examples thereof include a method using an adhesive, a method using a physical fixture, and the like.

In the method of using an adhesive, an adhesive is applied onto a surface of the frame 32 surrounding the hole portion 34 and the film 36 is placed thereon, so that the film 36 is fixed to the frame 32 with the adhesive. Examples of the adhesive include epoxy-based adhesives (Araldite (registered trademark) (manufactured by Nichiban Co., Ltd.) and the like), cyanoacrylate-based adhesives (Aron Alpha (registered trademark) (manufactured by Toagosei Co., Ltd.) and the like), acrylic-based adhesives, and the like.

Examples of the method using a physical fixture include a method in which the film 36 disposed to cover the hole portion 34 of the frame 32 is interposed between the frame 32 and a fixing member such as a rod, and the fixing member is fixed to the frame 32 by using a fixture such as a screw, and the like.

Although the film resonance structure 30 includes the frame 32 and the film 36 as separate bodies and has the structure in which the film 36 is fixed to the frame 32, the present invention is not limited thereto, and the film resonance structure 30 may have a structure in which the film 36 and the frame 32, which are formed of the same material, are integrated.

Figure 4:
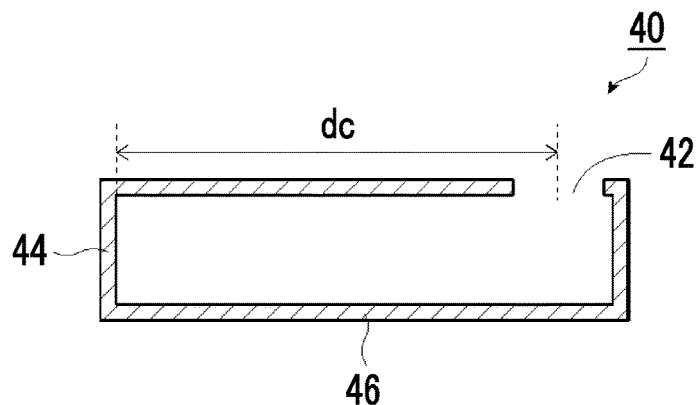
FIG. 4 is a cross-sectional view schematically illustrating an example of an air column resonance structure used in a soundproof structure body according to another embodiment of the present invention.

The air column resonance structure 40 illustrated in FIG. 4 can also be used as the resonance structure 14 of the present invention.

The air column resonance structure 40 is an air column resonance tube formed with a tubular body 46 having an opening 42 opened to the outside on one end side and having a blocked bottom surface 44 on the other end side.

The air column resonance structure used for the soundproof structure body according to the embodiment of the present invention may be a tube body having one end that is opened and the other end that is blocked, for example, a blocked tube, or may be a tubular body having both ends that are opened, for example, an opened tube. As described above, the air column resonance structure can be formed with the air column resonance tube including the blocked tube or the opened tube.

The structure of the tubular body 46 of the air column resonance tube 40 as described above can be configured similarly to the frame 32 of the film resonance structure 30 although the length and the shape are different, and the same material can be used.

The length dc of the tubular body 46 (the air column resonance tube) is defined as a distance between the center of the plane of the opening 42 of the tubular body 46 and the bottom surface 44 of the tubular body 46, as illustrated in FIG. 4.

However, in the case of the air column resonance tube 40, as described above, an experimental value or a simulation value of the impedance Z can be obtained by the following Expression (12) based on the reflection coefficient obtained by the experiment (measurement using four-microphones in an acoustic tube) or the simulation in the same manner as the cases of the Helmholtz resonance structure 20 and the film resonance structure 30.

As described above, the experimental value or the simulation value of the impedance Z thus obtained may be used as the impedance Z value.

As described above, in a case where there is a discrepancy between a theoretical value, an experimental value, and a simulation value, any value in a range between the theoretical value, the experimental value, and the simulation value can be adopted as the impedance value Z.

The soundproof structure body 10 according to the embodiment of the present invention and the resonance structure 14 used therein are basically formed as described above.

Hereinbelow, the theory that is a soundproof principle of the soundproof structure body 10 according to the embodiment of the present invention will be explained.

First, as illustrated in FIG. 1, the incident wave pi is incident into the opening tube line 12a of the tube body 12 from the opening portion 12b on one side of the tube body 12 and propagates and travels inside the opening tube line 12a of the tube body 12 toward the opening portion 12c side of the tube body 12. As described above, the opening portion 12b is a boundary that can be assumed to have no reflection. The waves such as the incident wave, the transmitted wave, and the reflected wave herein mean the sound pressure.

Since the resonance structure 14 (Helmholtz resonance structure 20) is disposed on the wall surface of the tube body 12, a part in an incident wave pi is absorbed by the resonance structure 14, but a part in the incident wave pi is reflected by the resonance structure 14. That is, the resonance hole 22 of the Helmholtz resonance structure 20, preferably a surface R1 passing through the center thereof, is a reflection end 1, and a part of the incident wave pi is reflected to be a reflected wave pr1 directed toward the opening portion 12b of the tube body 12 on the incident side. A remaining part of the incident wave pi (the part that was neither absorbed nor reflected) is transmitted through the reflection end 1 (R1) to be a transmitted wave pt1, and the transmitted wave pt1 propagates and travels inside the opening tube line 12a of the tube body 12 toward the opening portion 12c side of the tube body 12. Since the incident wave pi is absorbed by the resonance structure 14 and reflected by the reflection end 1 (R1), the transmitted wave pt1 is smaller than the incident wave pi. In the opening portion 12c of the tube body 12, the opening tube line 12a having the cross-sectional area St rapidly expands to the tube line 16a having the cross-sectional area S2 of the second tube body 16, so that the opening surface of the opening portion 12c (the end surface 16b of the second tube body 16) is an interface where the cross-sectional area is discontinuous, and is a reflection end 2 where reflection occurs. In practice, since the opening portion 12c of the tube body 12 needs to perform the opening end correction, the reflection end 2 is R2 illustrated by the dotted line in FIG. 1.

As a result, a part of the transmitted wave pt1 is reflected at the reflection end 2 (R2) and becomes a reflected wave pr2 directed toward the opening portion 12b of the tube body 12 on the incident side, and the reflected wave pr2 propagates and travels inside the opening tube line 12a of the tube body 12. Particularly, in a case where a difference between the cross-sectional area S2 of the second tube body 16 and the cross-sectional area S1 of the tube body 12 is large, the reflected wave pr2 is large.

A remaining part of the transmitted wave pt1 is emitted to the tube line 16a of the second tube body 16. As illustrated by the dotted line in FIG. 5, the transmitted wave Pt emitted in the open space is a remaining part of the incident wave pi, which is absorbed by the resonance structure 14, reflected by the reflection end 1 (R1), and reflected by the reflection end 2 (R2) at the opening end, so that it is sufficiently small.

Figure 5:
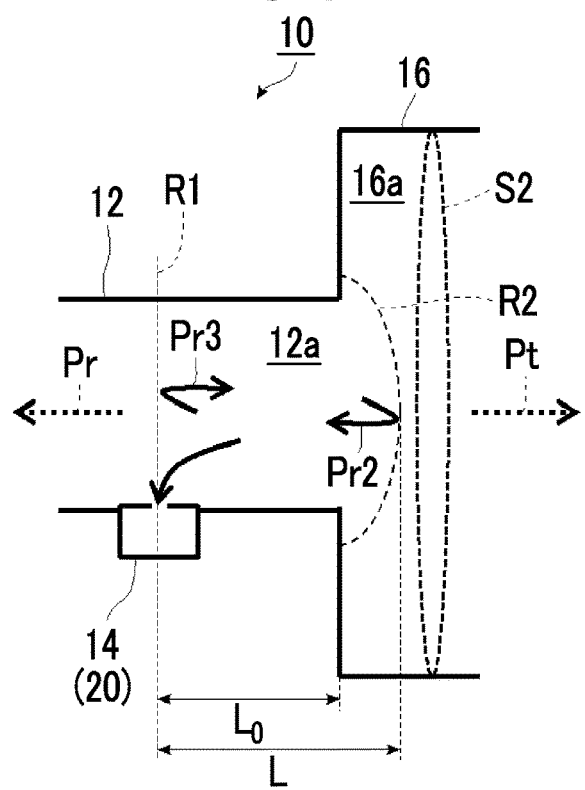
FIG. 5 is an explanatory diagram illustrating a soundproof principle of the soundproof structure body illustrated in FIG. 1.

The reflected wave pr2 directed toward the opening portion 12b of the tube body 12 on the incident side travels toward the resonance structure 14 (Helmholtz resonance structure 20) again and reaches the reflection end 1 (R1). Then, a part of the reflected wave pr2 is absorbed by the resonance structure 14, but the other part of the reflected wave pr2 is reflected by the reflection end 1 (R1) and becomes a reflected wave pr3, and the reflected wave pr3 travels toward the opening portion 12c of the tube body 12 again. As illustrated in FIG. 5, a part of the reflected wave pr3 reflected by the reflection end 1 (R1) is absorbed by the resonance structure 14 again, and a part of the other part is reflected by the reflection end 2 (R2). Basically, the transmitted wave pt1, and the reflected waves pr2 and pr3 are also small, so that the reflected wave pr2 and the reflected wave pr3 repeat multiple reflection between the reflection end 1 (R1) and the reflection end 2 (R2) while being confined therebetween, and are eventually absorbed by the resonance structure 14.

In the present invention, in the resonance structure 14 (Helmholtz resonance structure 20), the absorption is preferably greater than the reflection. That is, an absorbance of the resonance structure 14 at a single resonance type soundproof structure in a waveguide having the same thickness as that of the tube body 12 (opening tube line 12a) is preferably larger than the reflectance.

On the other hand, the remaining part of the reflected wave pr2 is transmitted through the reflection end 1 (R1) and becomes a reflected wave pr1', and the reflected wave pr1' travels toward the opening portion 12b of the tube body 12.

Therefore, the reflected wave pr1 reflected by the resonance structure 14 and the reflected wave pr1' reflected by the opening end overlap each other on the upstream of the resonance structure 14, and travel toward the opening portion 12b of the tube body 12. Therefore, in the present invention, the phase of the reflected wave pr1 and the phase of the reflected wave pr1' need to be inverted within a range of $\pi/2$ to $3\pi/2$ as much as possible, preferably need to be completely inverted from each other, so that the reflected wave pr1 and the reflected wave pr1' offset each other due to the interference effect.

That is, in order to offset the reflected wave pr1 and the reflected wave pr1' with each other through the interference effect, it is necessary that a phase difference $\theta$ between the reflected wave pr1 and the reflected wave pr1' is close to a value of $\pi$.

In the present invention, the phase difference $\theta$ between the reflected wave pr1 and the reflected wave pr1' needs to satisfy the following Inequation (1).

$$|\theta - \pi| \leq \pi/3 \tag{1}$$

Thereby, as illustrated by the dotted line in FIG. 5, the reflected wave Pr traveling toward the opening portion 12b of the tube body 12 on the incident side can be reduced.

That is, by appropriately specifying positions of the opening portion 12c of the opening tube line 12a of the tube body 12 and the resonance structure 14, the reflected wave pr1 from the resonance structure 14 (R1) and the reflected wave pr1' due to the opening end (R2) reflection are effectively offset each other, the absorbance of the single resonance structure 14 can be increased.

In addition, as illustrated in FIG. 1, in the soundproof structure body 10 according to the embodiment of the present invention, one resonance structure 14 can achieve high absorption. Therefore, in the present invention, it is possible to achieve high absorption with a smaller number of resonance structures 14, and as a result, it is possible to obtain high absorption with a small size.

Regarding pr1, the phase difference in the reflection of the reflected wave pr can be obtained by placing the resonance body such as the resonance structure 14 in an acoustic tube and measuring the reflection coefficient in a case where there is only one resonance body with the measurement using four-microphones.

pr2 is a reflected wave from the opening end, and by measuring the reflection coefficient of only the opening end using an acoustic tube (however, the method uses two microphones, so that a peripheral end portion is opened) in the same manner, phase changes in the reflection of the reflected wave pr2 can be obtained.

An acoustic impedance Za of the waveguide of the opening tube line 12a of the tube body 12 having the cross-sectional area S1 is Za=$\rho$c/S1, and the acoustic impedance Zb of the waveguide of the tube line 16a of the second tube body 16 having the cross-sectional area S2 is Zb=$\rho$c/S2. However, since a plane wave is not maintained near the opening end and inside the second tube body 16 (outlet side space), it is necessary to be handled with correction in a case where the subsequent reflectance is calculated. In this case, the acoustic impedance Zb cannot be represented by the simple Expression as described above, and is Zb=$\rho$c/Sx as corrected Expression. Here, Sx is a corrected cross-sectional area of the opening end, in which the opening end is corrected, and is a function of the reflectance of the opening end portion R2.

Therefore, in this case, an opening end reflectance R is given by the following Expression (14).

$$R = |(Zb - Za)/(Zb + Za)|^2 \tag{14}$$

Next, a combined characteristic impedance Z1 in consideration of the reflection end 1 (R1) of the resonance structure 14 described above, the opening end correction reflection end 2 (R2), and three interfaces including the waveguide between the reflection end 1 (R1) and the opening end correction reflection end 2 (R2) is obtained.

That is, a transfer matrix T in consideration of the three interfaces is given by the following Expression (4).

$$T = \begin{pmatrix} A & B \\ C & D \end{pmatrix} = \begin{pmatrix} 1 & 0 \\ \frac{1}{Z_R} & 1 \end{pmatrix} \begin{pmatrix} \cos kL & iZ_0 \sin kL \\ \frac{i}{Z_0} \sin kL & \cos kL \end{pmatrix} \begin{pmatrix} 1 & 0 \\ 0 & \frac{S_X}{S_I} \end{pmatrix} \tag{4}$$

Here, a first term on the right side of the above Expression (3) is a matrix representing the effect of the resonance structure 14 that is acoustically connected in parallel. A second term on the right side of the above Expression (3) represents a transfer matrix of a wave propagating a distance L of the waveguide between the reflection end 1 (R1) of the resonance structure 14 and the opening end correction reflection end 2 (R2). A third term on the right side of the above Expression (3) is a matrix specifying the reflection at the interface referred to as the opening end correction reflection end 2 (R2).

The impedance Z0 is the acoustic impedance Za of the waveguide of the tube body 12 described above, and is given by the following Expression (5).

$$Z0 = \rho c / S1 \tag{5}$$

The corrected cross-sectional area Sx of the opening end, in which the opening end is corrected, is given by the following Expression (6).

$$Sx = (1 + Rx(f))/(1 - Rx(f)) \times St \tag{6}$$

$Z_R$ is the impedance Z of the resonance structure 14, k is the wave number, c is the speed of sound, $\rho$ is the density of air, and Rx(f) is the corrected opening end reflectance on the opening portion 12c of the tube body 12, where f is the frequency, and $f < c/(4 \times (\sqrt{S1/\pi}))$, that is, the following Expression (15) needs to be satisfied.

$$f < c/(4^*(\sqrt{S1/\pi})) \tag{15}$$

The acoustic impedance Z1 of the soundproof structure body 10 can be represented as the following Expression (3) by using the matrix components A, B, C, and D, which are thus obtained in the above Expression (4).

$$Z1 = (A \times Z0 + B)/(C \times Z0 + D) \tag{3}$$

In a case where the obtained value of the acoustic impedance Z1 is close to Z0, the reflection can be reduced.

Therefore, in the present invention, the acoustic impedance Z1 preferably satisfies the following Expression (2) on a complex plane in consideration of the above Expression (14).

$$|(Z1-Z0)/(Z1+Z0)| < (Rx(f)) \quad (2)$$

That is, in the present invention, the acoustic impedance Z1 of the soundproof structure body 10, which is defined in the following Expression (2), preferably satisfies the above Expression (1) on a complex plane in a frequency range in which a frequency f satisfies $f<c/(4\times(\sqrt{(S1/\pi)}))$ (the above Expression (15)), where a waveguide distance from the resonance structure 14 to the opening portion 12c of the tube body 12, which includes an opening end correction, is denoted by L, an average cross-sectional area of a waveguide included in the tube body 12 is denoted by S1, and an opening end reflectance after the correction by the opening portion 12c is denoted by Rx(f).

In this way, since the acoustic impedance Z1 is close to the acoustic impedance Z0 of the waveguide of the tube body 12, the reflection at the reflection end 1 and the reflection end 2 can be reduced, and the absorption in the soundproof structure body 10 can be performed with high efficiency.

Next, the soundproof structure body according to a second embodiment of the present invention will be described in detail.

Figure 6:
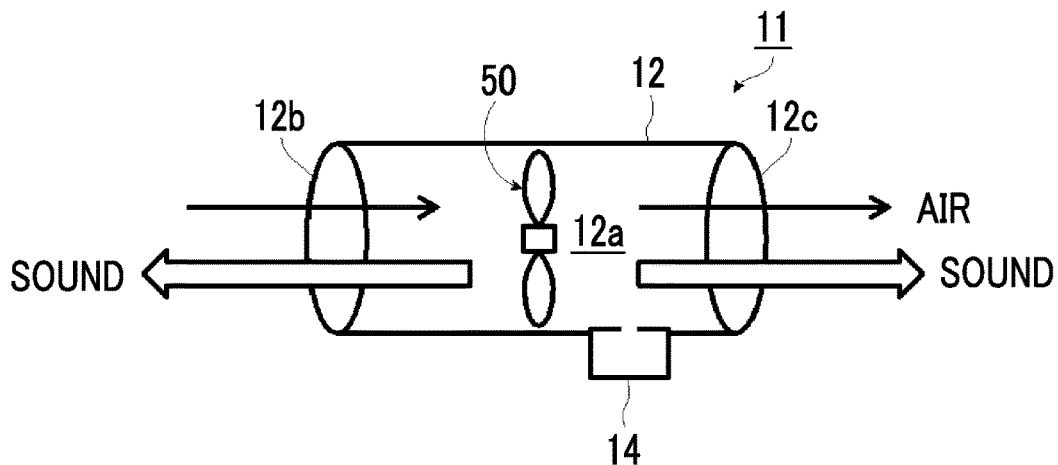
FIG. 6 is a cross-sectional schematic view conceptually illustrating an example of a soundproof structure body according to another embodiment of the present invention.

FIG. 6 is a cross-sectional view schematically illustrating an example of a soundproof structure body according to a second embodiment of the present invention.

The soundproof structure body 11 illustrated in FIG. 6 includes a tube body 12, a fan 50 installed in an opening tube line 12a of the tube body 12, and a resonance structure 14 installed on a wall surface of the tube body 12 on the opening portion 12c side.

The soundproof structure body 11 illustrated in FIG. 6 is the same as the soundproof structure body 10 illustrated in FIG. 1, except that the soundproof structure body 11 includes the fan 50 that serves as a noise source and a blower source in the tube body 12, in which the second tube body 16 having the large cross-sectional area S2 is not connected to the opening portion 12c of the tube body 12 and the opening portion 12c is opened to the open space of the tube body 12. Thus, the same numerals are given to the same components, and the description will not be repeated. In a case where the cross-sectional area S2 of the second tube body 16 is much larger than the cross-sectional area S1 of the second tube body 16, the opening portion 12c of the tube body 12 may be opened to the open space, so that the detailed description also will not be repeated.

Here, in a case where the fan 50 serving as a noise source is disposed in the tube body 12, the fan 50 serves as a reflection body due to an impedance, and the tube body 12 including the fan 50 has a complicated resonance mode. Therefore, it is preferable that the resonance frequency of the resonance structure 14 and the resonance frequency of the tube body 12 that includes the fan 50 serving as a noise source are close to each other to reduce the reflection, and the efficient absorption is performed.

It is preferable that a resonance frequency fr of the resonance structure 14 satisfies the following Expression (7), where the resonance frequency of the resonance structure 14 is denoted by fr, the resonance frequency of the tube body 12 that includes the fan 50 serving as the noise source is denoted by fn, and a difference between resonance frequencies of the tube body 12 including the fan 50 serving as the noise source, the resonance frequencies being adjacent to each other, is denoted by Δf.

$$fn-\Delta f/4 < fr < fn+\Delta f/4 \quad (7)$$

For example, in the case of FIG. 6, fn can be a frequency at which the sound pressure spectrum is maximized in a case where a speaker sound source is installed to contact with the fan 50 in the tube body 12 including the fan 50, and a case where the microphone sound pressure at a position away from the tube by about 30 cm in a case of generating white noise from the sound source is measured.

Figure 7:
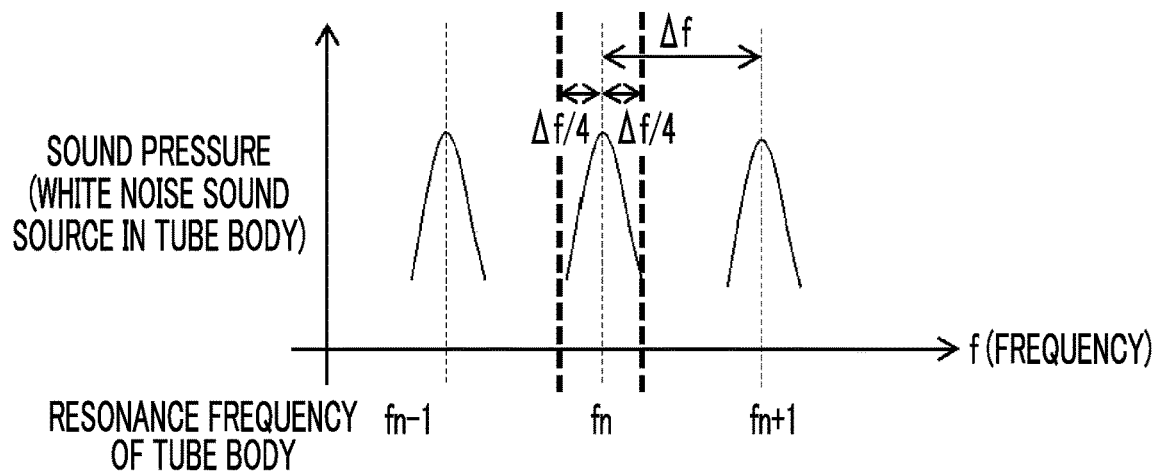
FIG. 7 is a graph illustrating sound pressure (sound pressure of a white noise sound source in a tube body) at a plurality of resonance frequencies of the tube body including a noise source of the soundproof structure body illustrated in FIG. 6.

As illustrated in FIG. 7, in a case where there are a plurality of resonance frequencies fn of the tube body 12 including the fan 50 serving as a noise source, the difference Δf between the resonance frequencies is represented by $\Delta f = f_{n+1} - fn$ or $fn - f_{n+1}$. Therefore, the range represented by the above Expression (7) is a range illustrated by the thick dotted line in FIG. 7.

In addition, it is more preferable that the resonance frequency fr and the resonance frequency fn coincide with each other.

Furthermore, it is preferable that the peak frequency of a noise spectrum of the fan 50 serving as a noise source and the resonance frequency of the resonance structure 14 coincide with each other.

The fan 50 serving as a noise source used in the present invention is not particularly limited, and various known fans in the related art can be used. Examples thereof include a propeller fan, an axial flow fan, a blower fan, a sirocco fan, a cross flow fan, or the like.

The noise source is not limited to the fan 50, but may be a rotating body such as a motor or a pump, an inverter, a power supply, a booster, a boost converter, a power control unit (PCU) including an inverter, wind noise caused by obstacles that obstruct the air flow path, or the like can be used.

Sound has wave functions for sound pressure and particle velocity, respectively, but basically, all discussions of phase, amplitude, or the like in the present specification deal with the wave functions of sound pressure.

In the present invention, a phase difference (phase change) between the reflected wave and the transmitted wave can be obtained as follows.

As a first method, in a case of a general resonance body such as the Helmholtz resonance structure and the film resonance structure, an impedance of the resonance body can be obtained from the size of the structure, so that a reflection coefficient and a transmission coefficient (both are complex numbers) can be calculated using a transfer matrix method. Since the declination of these coefficients corresponds to the phase change, the phase change (phase difference) of the reflected wave and the transmitted wave can be calculated.

As a second method, as described above, in a case of not representing with simple Theoretical Expression, the phase difference (phase change) of the reflected wave and the transmitted wave can be obtained by an experiment.

The resonance type soundproof structure is measured by a method using four-microphones in an acoustic tube having the same cross-sectional area as the tubular tube body. The reflection coefficient and transmission coefficient can be measured with an experiment through the method using four-microphones, that is, the phase change (phase difference) of the reflected wave and the transmitted wave can be obtained. θ can be calculated using the amount of these phase changes.

The phase difference (phase change) of the reflected wave and the transmitted wave can also be obtained by a simulation (a finite element method).

In the simulation of the finite element method, the phase difference of the wave function of the sound pressure at each position can be obtained. For example, in a case where a wave function of an incident wave is denoted by pi(z), a reflected wave of a wave function and a transmitted wave of a wave function are denoted by pr(z) and pt(z), respectively, and a position of the resonance body is z=d, the reflection coefficient r=pr(d)/pi(d) and the transmission coefficient t=pt(d)/pi(d) are calculated. The declinations are the amounts of phase changes. The phase difference θ can be calculated using the amount of these phase changes.

In the present invention, the acoustic characteristics such as the degree of sound absorption of the resonance type soundproof structure can be measured by a method using four-microphones in an acoustic tube. A thickness of the acoustic tube is the same cross-sectional area as that of the tubular tube body. A measurement system 60 for acoustic characteristics is illustrated in FIG. 29.

In the measurement system 60 illustrated in FIG. 29, the resonance structure 14 (resonance type soundproof structure) is disposed in an aluminum acoustic tube (tube 62), and the acoustic characteristics were measured by a transfer function method using four-microphones 64 disposed in the acoustic tube (tube body 62). This method complies with "ASTM E2611-09: Standard Test Method for Measurement of Normal Incidence Sound Transmission of Acoustical Materials Based on the Transfer Matrix Method". As the acoustic tube, an aluminum tube body 62 having the same measurement principle as, for example, WinZac manufactured by Nittobo Acoustic Engineering Co., Ltd. was used. The cylindrical box 68 containing the speaker 66 therein was disposed on the lower side of the tube body 62, and the tube 62 was placed on the upper surface of the box 68. Sound with a predetermined sound pressure was output from a speaker 66, and measurement was performed with four-microphones 64. In this manner, a sound transmission loss can be measured in a wide spectrum band.

EXAMPLES

The soundproof structure body according to the embodiment of the present invention will be specifically described based on Examples.

Example 1

First, a soundproof structure body 10 according to the embodiment of the present invention illustrated in FIG. 1 was used as Example 1.

As illustrated in FIG. 1, in the soundproof structure body 10 of Example 1, the Helmholtz resonance structure 20 is used as the resonance structure 14, the resonance hole 22 of the Helmholtz resonance structure 20 and the hollow space 24 of the back surface were installed the wall surface of the tube body 12 to communicate within the opening tube line 12a.

Various parameters of the soundproof structure body 10 of Example 1 were as follows.

Length Ld of the tube body 12 is 500 mm.
A radius r1 of the opening tube line 12a of the tube body 12 is 30 [mm]
A cross-sectional area S1 of the opening tube line 12a of the tube body 12 is 2827 [mm$^2$]

A radius r2 of the tube line 16a of the second tube body 16 is 1000 [mm]
A cross-sectional area S2 of the tube line 16a of the second tube body 16 is 3.142×10$^6$ [mm$^2$].

Distance L0 between the resonance structure 14 (the center of the resonance hole 22 of the Helmholtz resonance structure 20: the reflection end 1 (R1)) and the opening portion 12c of the tube body 12 is 20 mm.

Distance L between the resonance structure 14 (the center of the resonance hole 22 of the Helmholtz resonance structure 20: the reflection end 1 (R1)) and the opening end after the opening end correction (the reflection end 2 (R2) after the correction) is 38 mm.

A cross-sectional area Sn of the resonance hole 22 (9.5 mm square) of the Helmholtz resonance structure 20a is 90.25 [mm$^2$].

A length lc of the resonance hole 22 of the Helmholtz resonance structure 20 is 5 [mm].

A volume Vc of the hollow space 24 of the Helmholtz resonance structure 20 is 4000 [mm$^3$].

The left end of the tube body 12 is an incident surface of sound waves, and the influence of the reflection from the left end in a case where waves reflected from the resonance structure or the opening portion reached the tube body 12 is not considered.

<Simulating Method of Phase Difference θ>

In Example 1, a phase change θr1 of the sound pressure due to the reflection from the resonance structure 14 and a phase change θr2 between the transmitted wave that is transmitted through the resonance structure 14 and the reflected wave that is reflected from the opening end portion (reflection end 2 (R2)) to the position of the resonance structure 14 was simulated by the following procedure.

From a transfer matrix $T_R$ considering only the following resonance structure, the following reflection coefficient r1 and the phase change θr1 were calculated by the following Expressions (16) and (17).

Reflection coefficient $r1=(Zx-Z0)/(Zx+Z0)$

Phase change $\theta r1 = \arg(r1)$ $$T_R = \begin{pmatrix} A_R & B_R \\ C_R & D_R \end{pmatrix} = \begin{pmatrix} 1 & 0 \\ \frac{1}{Z_R} & 1 \end{pmatrix} \quad (16)$$

$$Zx = (A_R Z0 + B_R)/(C_R Z0 + D_R) \quad (17)$$

$$Z0 = \rho c / S1 \quad (5)$$

$Z_R$ is the impedance of the Helmholtz resonance structure 20.

On the other hand, in the same manner, from the transfer matrix $T_R$ considering only the following resonance structure, the following transmission coefficient t1 and the phase change θr2 were calculated by the following Expressions (16) and (17).

Transmission coefficient $t1=t=2/(A_R+B_R/Z0+C_R Z0+D_R)$

Phase change $\theta r2 = 2\arg(t1) + \arg(\exp(ikL)) + \pi$ (In the case of S2>>S1, the phase is inverted to be a free end with respect to the sound pressure due to the reflection at the opening end R2. Therefore, R≈−1)

Here, L is the distance between the resonance structure 14 and the correction opening end R2, and k is the wave number.

The phase difference θ was obtained by the following Expression (18) using the obtained phase changes θr1 and θr2 in this way.

$$\theta = \theta r1 - \theta r2 \quad (18)$$

From the phase difference θ obtained in this way, the relationship between the difference θ−π between the phase difference θ and π, and the frequency was obtained. The results are illustrated in FIG. 8.

The resonance frequency of the Helmholtz resonance structure 20 that is the resonance structure 14 could be referred to as a frequency at which the imaginary part Zx is 0, and this frequency was 2180 Hz.

Figure 8:
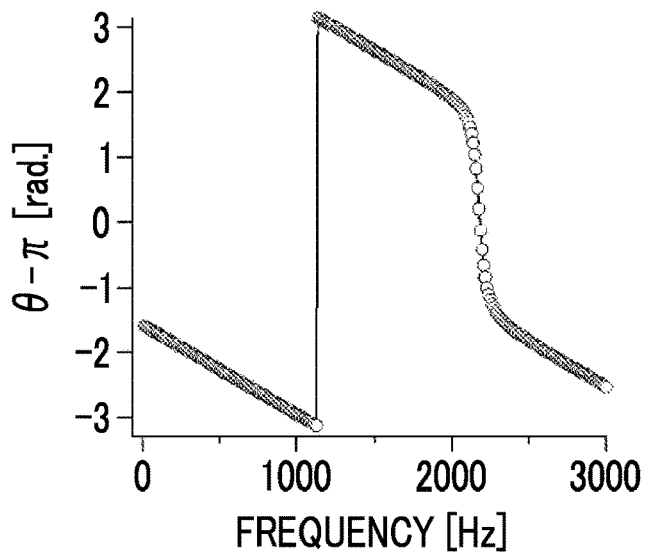
FIG. 8 is a graph illustrating the frequency characteristics of a difference θ−π obtained by subtracting π from a phase difference θ between two reflected waves of a soundproof structure body in Example 1.

From a graph in FIG. 8, it can be seen that the difference θ−π≈0.20 [rad.] at the resonance frequency of 2180 Hz, which is smaller than π/3.

That is, |θ−π| is equal to or smaller than π/3, and it can be seen that Example 1 satisfies matters used to specify the invention according to claim 1 of the present invention.

In Example 1, a transmission (T), a reflection (R), and an absorption (Ab) were simulated by the following procedure.

The following Expressions (19) and (20) based on the above Expressions (2) to (4) were calculated. However, the reflection coefficient and the transmission coefficient were obtained using only one term on the left side of the matrix of the above Expression (4).

$$\text{Reflection coefficient } r=(Z1-Z0)/(Z1+Z0) \quad (19)$$

$$\text{Transmission coefficient } t=2/(A+B/Z+CZ+D) \quad (20)$$

The reflectance R, the transmittance T, and the absorbance Ab were determined using the reflection coefficient r and the transmission coefficient t obtained in this way.

Reflectance $R=r$

Transmittance $T=t^2$

Absorbance $Ab=1-R-T$

Figure 9:
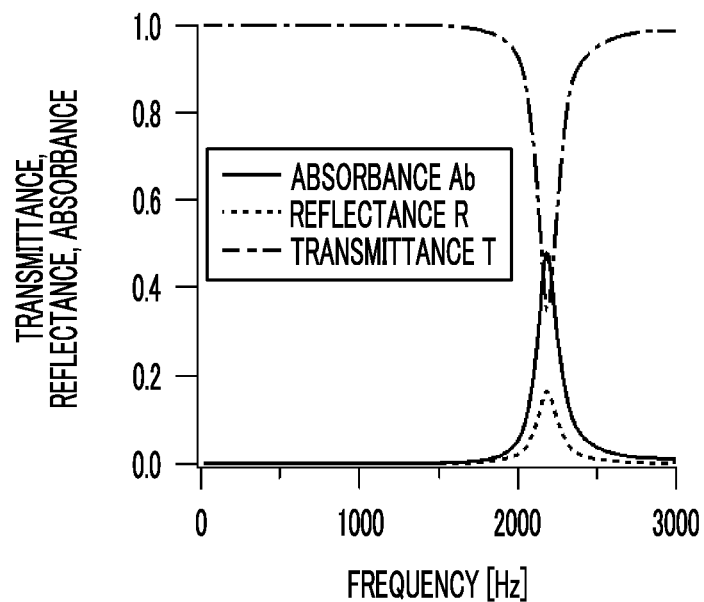
FIG. 9 is a graph illustrating frequency characteristics of a reflectance, a transmittance, and an absorbance in an acoustic tube of the soundproof structure body of Example 1.

The reflectance R, the transmittance T, and the absorbance Ab in the acoustic tube (tube body 12) obtained in this way are illustrated in FIG. 9.

As illustrated in FIG. 9, it can be seen that the absorbance Ab is higher than the reflectance R, especially at a resonance frequency of around 2180 Hz.

Therefore, it can be seen that Example 1 satisfies matters used to specify the invention according to claim 2 of the present invention.

Example 1-1

Next, in the following procedure, transmission, reflection, and absorption in the soundproof structure body of Example 1-1 of the present invention were simulated using a transfer matrix method. This model is a new model that differs from a model in the related art in that there is a step (with an opening end) having a discontinuous cross-sectional area.

In the same manner as described above, Expressions based on the above Expressions (2) to (4) were calculated.

That is, the reflection coefficient and the transmission coefficient were determined based on the acoustic impedance Z1.

$$\text{Reflection coefficient } r=(Z1-Z0)/(Z1+Z0) \quad (19)$$

$$\text{Transmission coefficient } t=2/(A+B/Z+CZ+D) \quad (20)$$

The reflectance R, the transmittance T, and the absorbance Ab were determined using the reflection coefficient r and the transmission coefficient t obtained in this way.

Reflectance $R=r$

Transmittance $T=t^2\times(Sx/S1)$

Absorbance $Ab=1-R-T$

Figure 10:
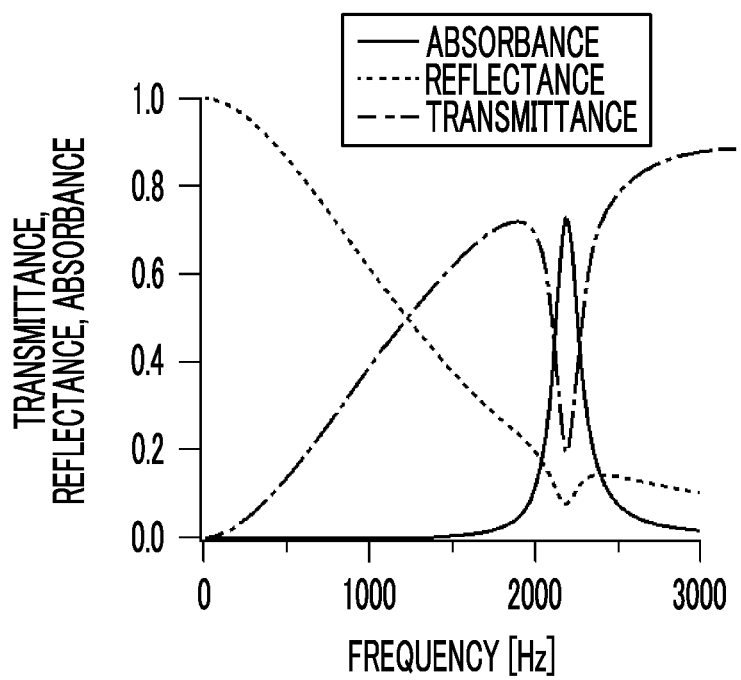
FIG. 10 is a graph illustrating frequency characteristics of a reflectance, a transmittance, and an absorbance in a soundproof structure body of Example 1-1.

The reflectance R, the transmittance T, and the absorbance Ab determined in this way are illustrated in FIG. 10.

In Example 1-1, it can be seen that a higher absorbance than the absorbance of the single soundproof structure body in a case where there is no opening end of Example 1 could be realized, and the efficient sound absorption can be achieved by efficiently capturing the reflected wave from the opening end portion.

Figure 11:
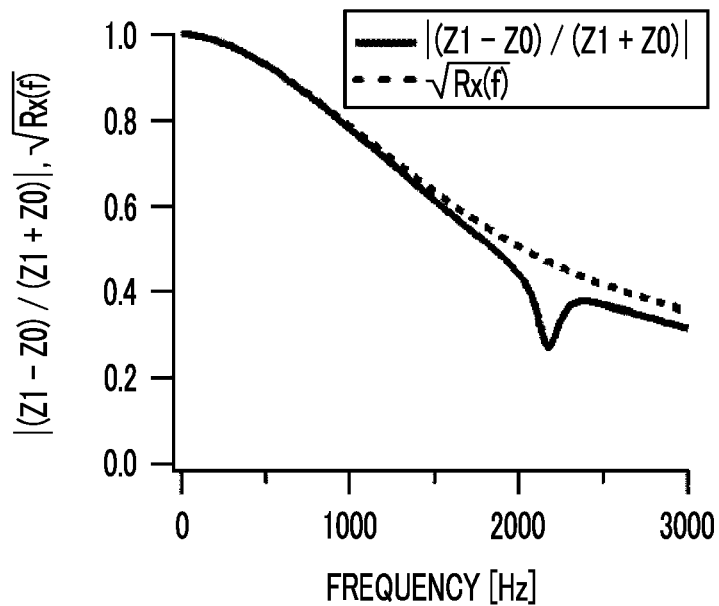
FIG. 11 is a graph illustrating frequency characteristics of an absolute value of a reflection coefficient and an absolute value of a reflection coefficient of opening end reflection in the soundproof structure body of Example 1-1.

In FIG. 11, the absolute value $|(Z1-Z0)/(Z1+Z0)|$ of the reflection coefficient r of the soundproof structure body is illustrated by a solid line, and the absolute value $|\sqrt{Rx(f)}|$ of the reflection coefficient of the opening end reflection (in a case where there is only the opening end) is illustrated by a dotted line.

Here, $c/(4\times(\sqrt{(S1/\pi)}))$ was 2858 Hz.

According to the above, it can be seen that the above Expression (2) is satisfied over the frequency region of f<2858 Hz, and Example 1-1 further satisfies matters used to specify the invention according to claim 3 of the present invention.

Here, the opening end reflectance Rx(f) of the opening end portion was determined as follows.

By using an acoustic module of COMSOL MaltiPhysics Ver 5.3a, a calculation was performed in the following calculation model, and the reflectance from the opening end portion was calculated by calculating a magnitude of the reflected wave.

Figure 12:
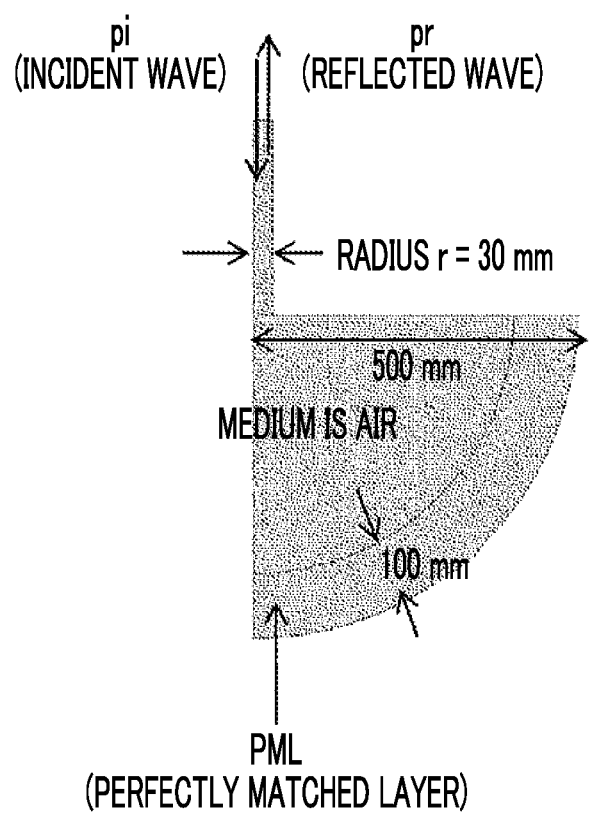
FIG. 12 is an explanatory diagram illustrating a cylindrical target model for calculating an opening end reflectance of the soundproof structure body of Example 1-1.

A cylindrical target model as a calculation model is illustrated in FIG. 12.

As illustrated in FIG. 12, the calculation model is a cylindrical target model in which an incident wave pi of a plane wave is incident, and a reflected wave pr is emitted from the opening portion on one side of a cylindrical tube having a radius of 30 mm and a length of 300 mm. The opening end of the opening portion on the other side of the cylindrical tube is formed of a ¼ circle region having a radius of 500 mm in which the medium is air, and a perfectly matched layer (PML) extending 100 mm inward from the outer circumference of the ¼ circle was set.

Figure 13:
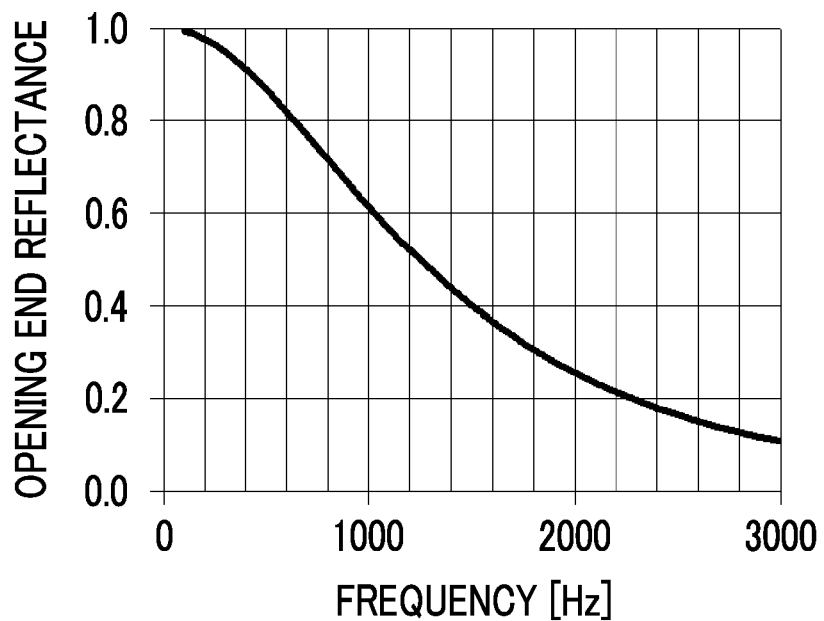
FIG. 13 is a graph illustrating frequency characteristics of the opening end reflectance of the soundproof structure body of Example 1-1.

The calculation result of the opening end reflectance Rx(f) obtained by using the calculation model is illustrated in FIG. 13. In the present model, the opening end reflectance can be determined as $Rx(f)=|pr/pi|^2$, where the incident sound pressure is denoted by pi and the reflected sound pressure is denoted by pr.

The reflectance function Rx(f) obtained from a graph illustrated in FIG. 13 is as follows.

$$Rx(f)=9.03E-18\times f^5-1.05E-13\times f^4+4.41E-10\times f^3-7.15E-7\times f^2-1.12E-5\times f+1$$

The results comparing the absolute value of the reflection coefficient (the absolute value of the above Expression (19)) with $\sqrt{Rx(f)}$ is illustrated in FIG. 11. $\sqrt{Rx(f)}$ corresponds to the absolute value of the reflection coefficient in a case where the resonance structure is not installed in the tube body. It can be seen from FIG. 11 that the absolute value of the reflection coefficient is smaller in a case where the Helmholtz resonance structure is placed inside the tube body than a case where the Helmholtz resonance structure is not placed (claim 3 is satisfied). That is, it can be seen that the reflected wave can be suppressed efficiently. Furthermore, in a case of comparing the absorbances of FIGS. 9 and 10, it can be seen that the absorption peak in FIG. 10 is larger than that of FIG. 9 in a case where there is the opening end, even though only one Helmholtz structure is installed in both. That is, it can be seen that the absorption is efficiently occurs.

Comparative Example 1-1

Comparative Example 1-1 was the same as in Example 1, except that the distance L was 68 [mm].

In Comparative Example 1-1, the phase difference θ is also determined in the same way, and the relationship between the difference θ-π between the phase difference θ and 7C and the frequency was obtained. The results are illustrated in FIG. 14.

As described above, the resonance frequency of the resonance structure 14 can be a frequency at which the imaginary part of Zx is 0. This resonance frequency was 2180 Hz in the same manner as in Example 1.

Figure 14:
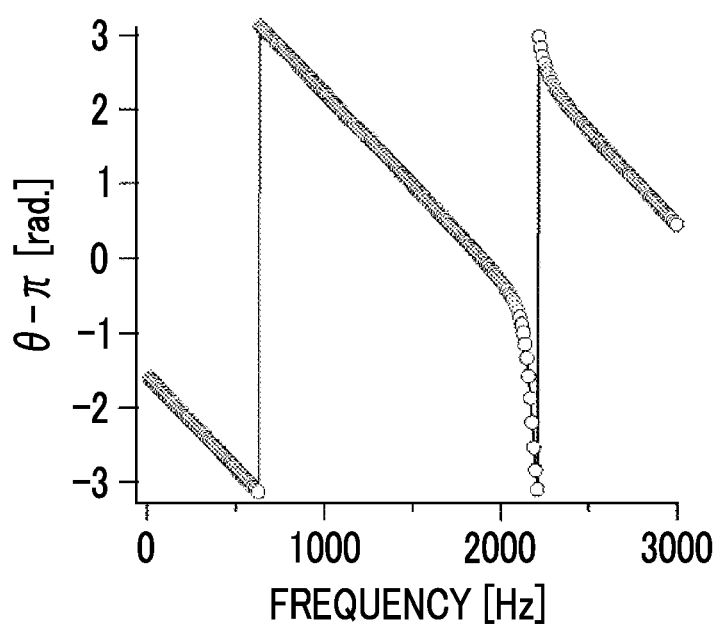
FIG. 14 is a graph illustrating frequency characteristics of a difference θ–π obtained by subtracting n from a phase difference θ between two reflected waves of a soundproof structure body of Comparative Example 1-1.

From a graph in FIG. 14, it can be seen that the difference θ-π≈2.2 [rad.] at the resonance frequency of 2180 Hz, which is greater than π/3. That is, since |θ-π| was greater than π/3, and it can be seen that Comparative Example 1-1 does not satisfy Inequation (1) of the invention according to claim 1 of the present invention.

The transmittance, reflectance, and absorbance in the tube body 12 that is an acoustic tube having a radius of 30 mm were the same as in FIG. 9 and the same as in Example 1.

Figure 15:
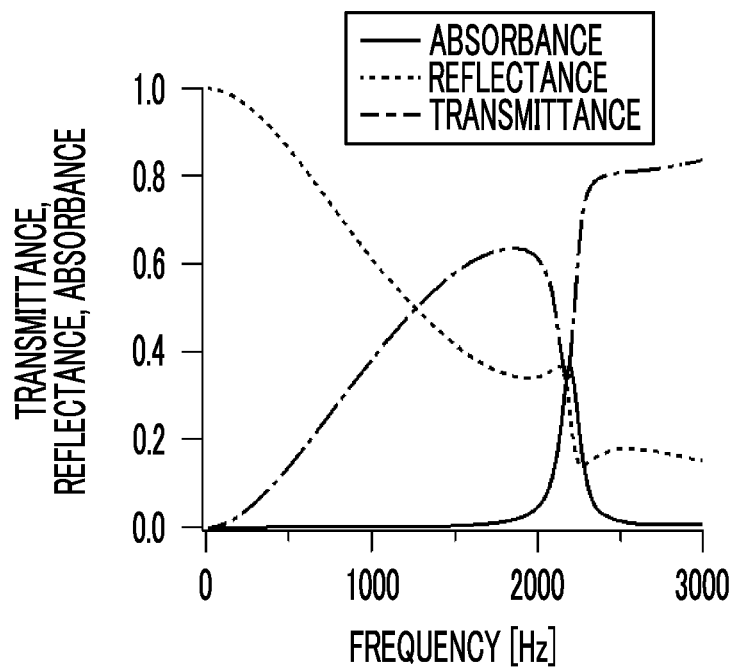
FIG. 15 is a graph illustrating frequency characteristics of a reflectance, a transmittance, and an absorbance in the soundproof structure body of Comparative Example 1-1.

In Comparative Example 1-1, the transmittance, reflectance, and absorbance of the soundproof structure body were also calculated in consideration of the soundproof structure body and the opening end reflection. The calculation result is illustrated in FIG. 15.

Figure 16:
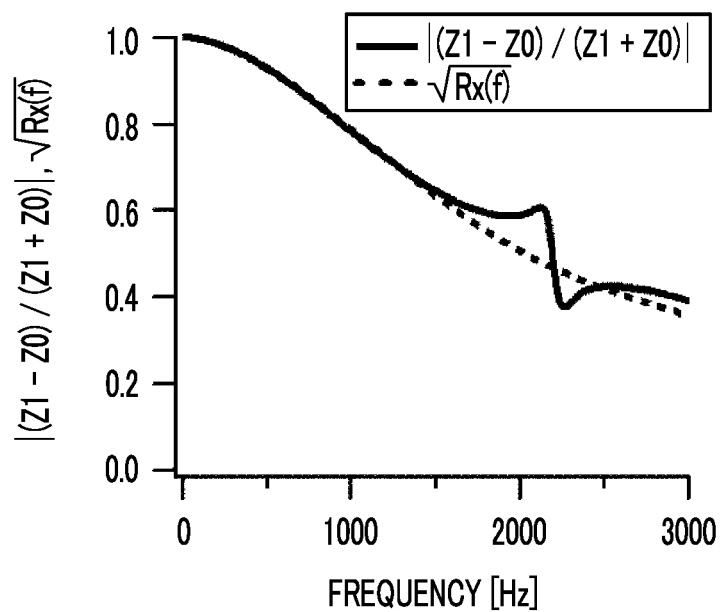
FIG. 16 is a graph illustrating frequency characteristics of an absolute value of a reflection coefficient and an absolute value of a reflection coefficient of opening end reflection in the soundproof structure body of Comparative Example 1-1.

In FIG. 16, the absolute value |(Z1−Z0)/(Z1+Z0)| of the reflection coefficient r of the soundproof structure body is illustrated by a solid line, and the absolute value |√Rx(f))| of the reflection coefficient of the opening end reflection (in a case where there is only the opening end) is illustrated by a dotted line.

As illustrated in FIG. 16, in the frequency region of f<2858 Hz, there is a region that does not satisfy the above Expression (2), and in Comparative Example 1-1, there is a frequency region in which the absolute value of the reflection coefficient is larger in a case where the Helmholtz resonance structure is installed than a case where the Helmholtz resonance structure is not installed, that is, the reflection cannot be suppressed efficiently. Furthermore, in a case of comparing absorption values of FIGS. 9 and 15, it can be seen that the absorption peak value in FIG. 15 is larger than that of FIG. 9 in a case where there is the opening end, even though only one Helmholtz structure is installed in both. Therefore, it can be seen that the absorption cannot be efficiently realized, and the absorption is not effectively achieved in a case of not satisfying matters used to specify the inventions according to claims 1 and 3 of the present invention Comparative Example 1-2

Comparative Example 1-1 was the same as in Example 1, except that the distance L was 8 [mm].

In Comparative Example 1-2, the phase difference θ is also determined in the same way, and the relationship between the difference θ-t and the frequency was obtained. The results are illustrated in FIG. 17.

As described above, the resonance frequency of the resonance structure 14 can be a frequency at which the imaginary part of Zx is 0. This resonance frequency was 2180 Hz in the same manner as in Example 1.

Figure 17:
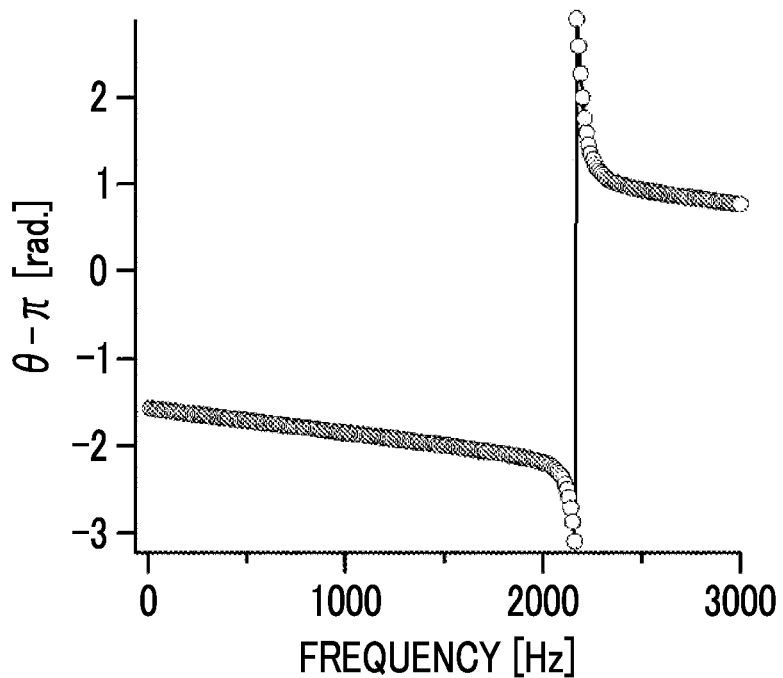
FIG. 17 is a graph illustrating frequency characteristics of a difference θ–π obtained by subtracting n from a phase difference θ between two reflected waves of a soundproof structure body in Comparative Example 1-2.

From a graph in FIG. 17, it can be seen that θ-π≈2.6 [rad.] at the resonance frequency of 2180 Hz, which is greater than π/3. That is, since |θ-π| was greater than π/3, and it can be seen that Comparative Example 1-1 does not satisfy Inequation (1) of the invention according to claim 1 of the present invention.

The transmittance, reflectance, and absorbance in the tube body 12 that is an acoustic tube having a radius of 30 mm were the same as in FIG. 9 and the same as in Example 1.

Figure 18:
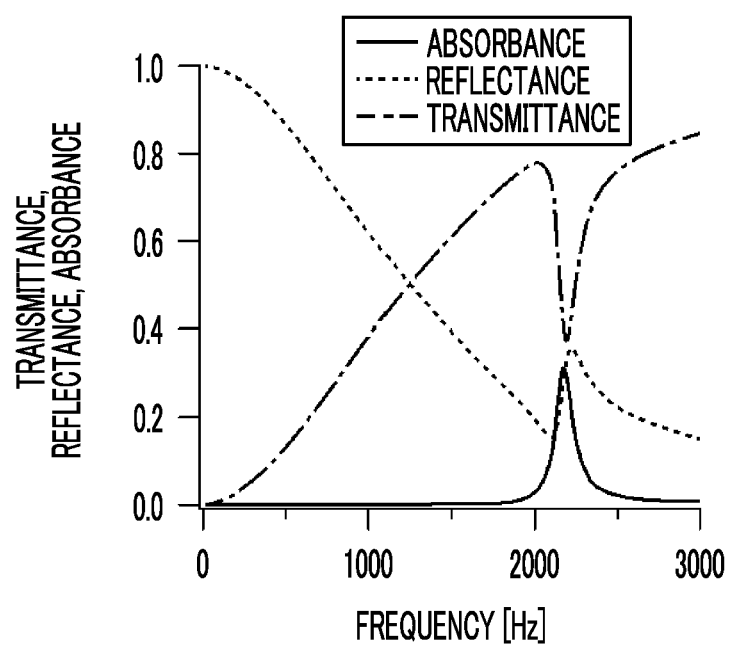
FIG. 18 is a graph illustrating frequency characteristics of a reflectance, a transmittance, and an absorbance in the soundproof structure body of Comparative Example 1-2.

In Comparative Example 1-2, the transmittance, reflectance, and absorbance of the soundproof structure body were also calculated in consideration of the soundproof structure body and the opening end reflection. The calculation result is illustrated in FIG. 18.

Figure 19:
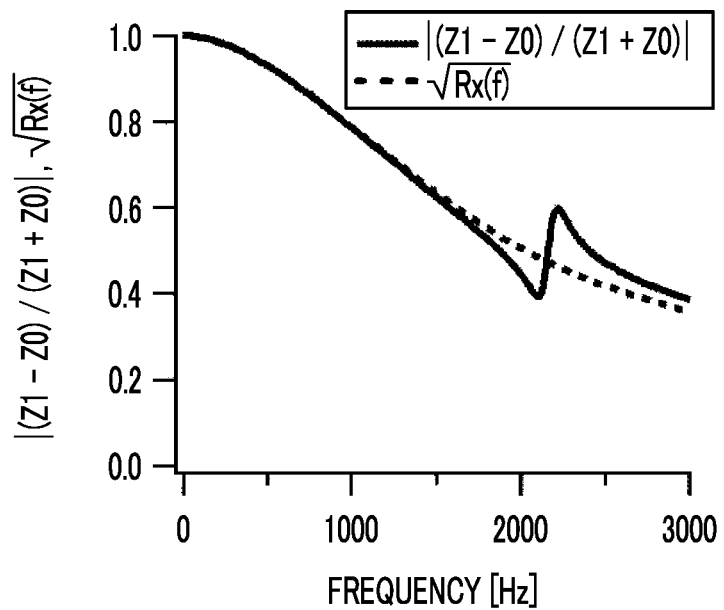
FIG. 19 is a graph illustrating frequency characteristics of an absolute value of a reflection coefficient and an absolute value of a reflection coefficient of opening end reflection in the soundproof structure body of Comparative Example 1-2.

In FIG. 19, the absolute value |(Z1−Z0)/(Z1+Z0)| of the reflection coefficient r of the soundproof structure body is illustrated by a solid line, and the absolute value |√Rx(f))| of the reflection coefficient of the opening end reflection (in a case where there is only the opening end) is illustrated by a dotted line.

As illustrated in FIG. 19, in the frequency region of f<2858 Hz, there is a region that does not satisfy the above Expression (2), and in Comparative Example 1-2, there is a frequency region in which the absolute value of the reflection coefficient is larger in a case where the Helmholtz resonance structure is installed than a case where the Helmholtz resonance structure is not installed, that is, the reflection cannot be suppressed efficiently. Furthermore, in a case of comparing absorption values of FIGS. 9 and 18, it can be seen that the absorption peak value in FIG. 18 is larger than that of FIG. 9 in a case where there is the opening end, even though only one Helmholtz structure is installed in both. Therefore, it can be seen that the absorption cannot be efficiently realized, and the absorption is not effectively achieved in a case of not satisfying matters used to specify the inventions according to claims 1 and 3 of the present invention Example 1-2

Example 1-2 was the same as in Example 1, except that the radius of the tube body 12 has a cross-sectional area S1 of 15 mm.

In Example 1-2, the phase difference θ is also determined in the same way, and the relationship between the difference θ-π and the frequency was obtained. The results are illustrated in FIG. 20.

As described above, the resonance frequency of the resonance structure 14 can be a frequency at which the imaginary part of the characteristic impedance Zx is 0. This resonance frequency was 2180 Hz in the same manner as in Example 1.

Figure 20:
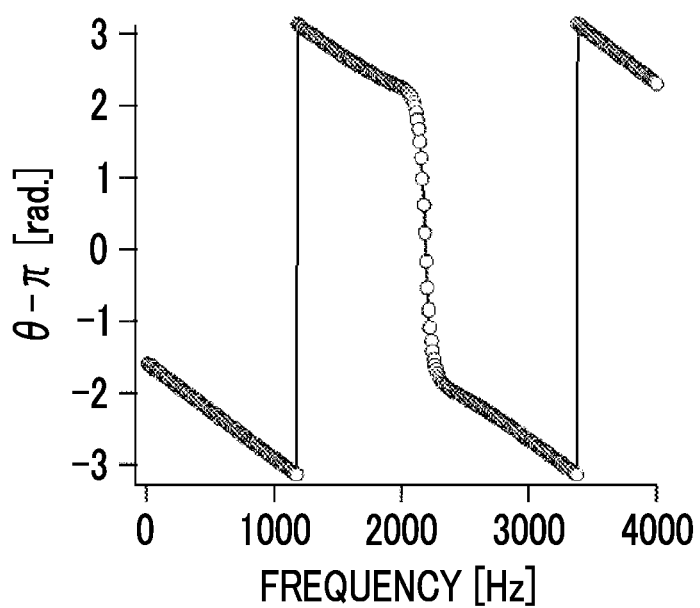
FIG. 20 is a graph illustrating the frequency characteristics of a difference θ–π obtained by subtracting 71 from a phase difference θ between two reflected waves of a soundproof structure body in Example 1-2.

From a graph in FIG. 20, it can be seen that θ-π≈0.22 [rad.] at the resonance frequency of 2180 Hz. That is, |θ-π| is greater than π/3, and it can be seen that Example 1-2 satisfies Inequation (1) of claim 1 of the present application.

Figure 21:
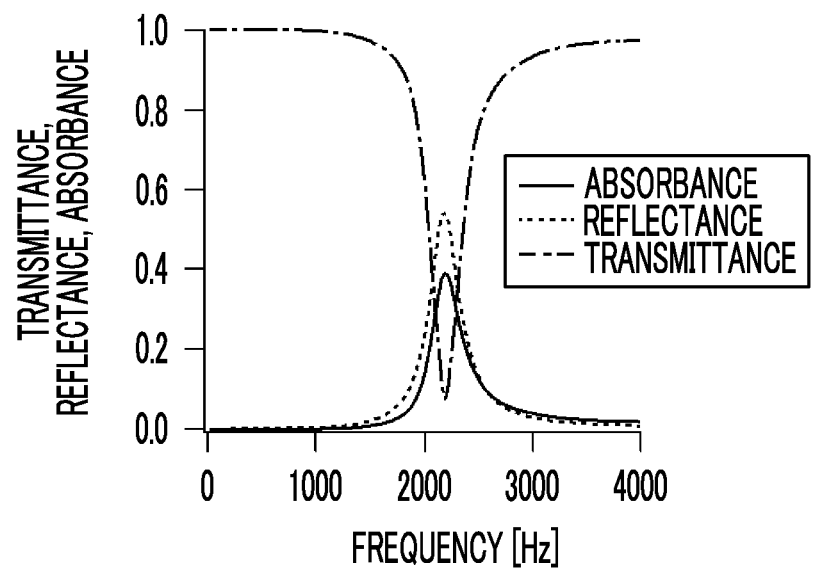
FIG. 21 is a graph illustrating frequency characteristics of a reflectance, a transmittance, and an absorbance in an acoustic tube of the soundproof structure body of Example 1-2.

Next, in Example 1-2, the reflectance R, the transmittance T, and the absorbance Ab in the acoustic tube having a radius of 15 mm were also determined in the same manner as in Example 1, and the results are illustrated in FIG. 21.

As illustrated in FIG. 21, in the acoustic tube having a radius of 15 mm in Example 1-2, the reflectance R is higher than the absorbance Ab, particularly at a resonance frequency of around 2180 Hz, and thus it can be seen that the invention does not satisfy claim 2 of the present application.

The opening end reflectance Rx(f) in the tube body 12 having a radius of 15 mm was determined by the same procedure as in Example 1. The results are as follows.

$$Rx(f)=-7.31E-15\times f^4+6.55E-11\times f^3-2.10E-7\times f^2+1.83E-5\times f+1$$

In Example 1-2, the transmittance, reflectance, and absorbance of the soundproof structure body were also calculated in consideration of the soundproof structure body and the opening end reflection. The calculation result is illustrated in FIG. 22.

Figure 22:
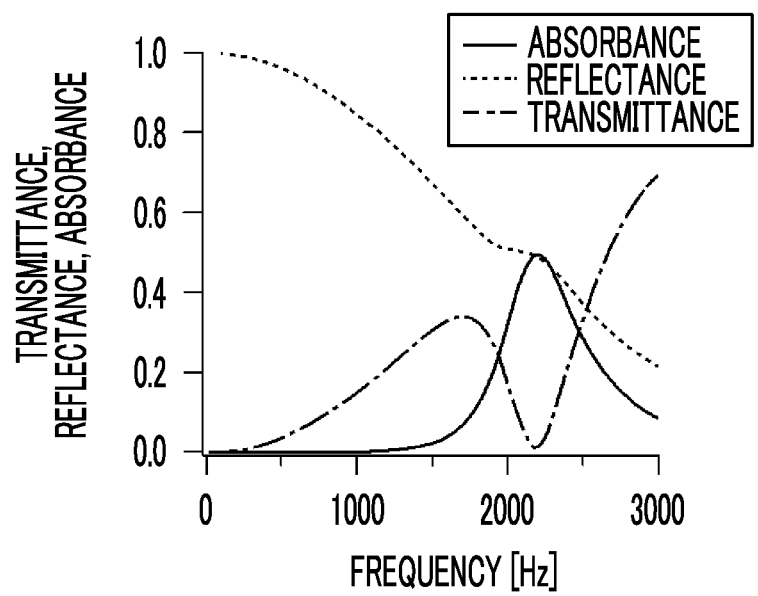
FIG. 22 is a graph illustrating frequency characteristics of a reflectance, a transmittance, and an absorbance in the soundproof structure body of Example 1-2.

As illustrated in FIG. 22, in Example 1-2, claim 1 of the present application is satisfied, and a higher absorbance than in the case of using the single resonance structure 14 can be realized.

However, since the reflectance of the resonance structure 14 is basically large, a constant reflectance remains. Therefore, it can be seen that higher absorption can be achieved in the case of Example 1 which satisfies the requirement of claim 2 of the present application.

Figure 23:
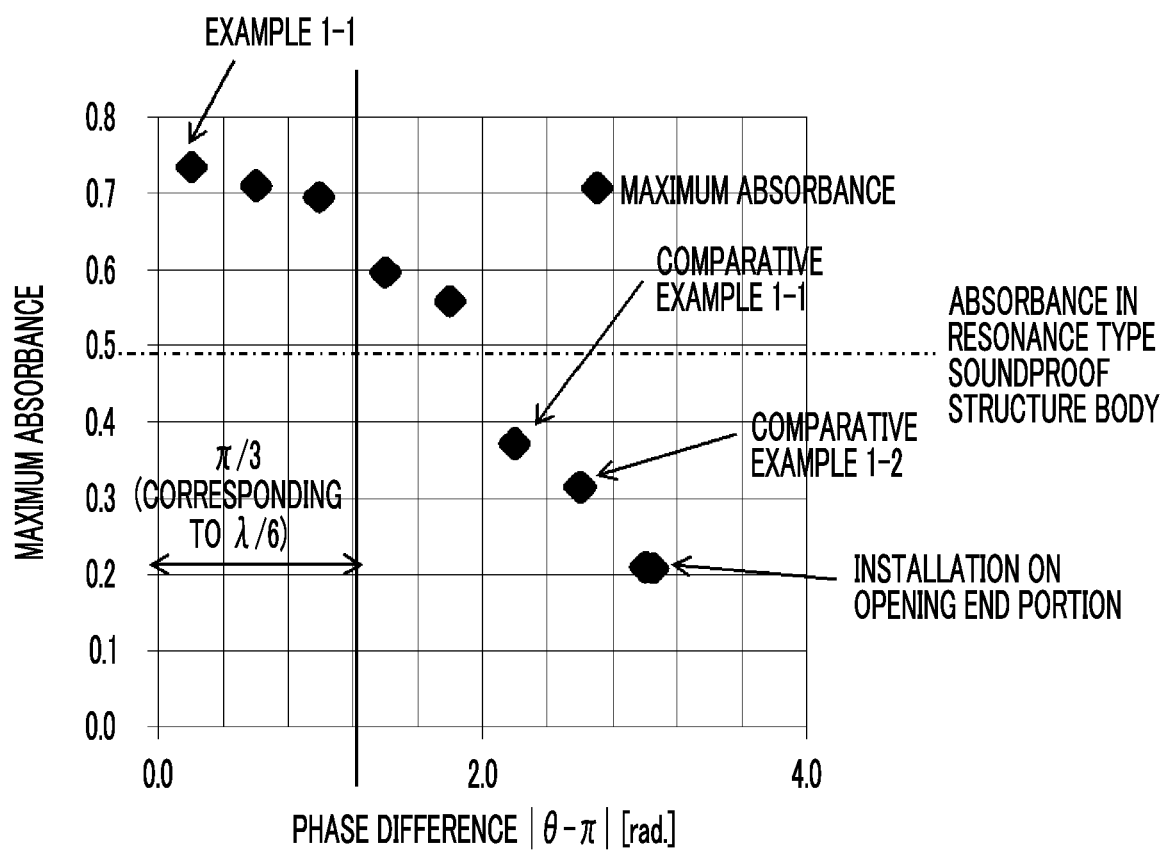
FIG. 23 is a graph illustrating a relationship between a maximum absorbance and the difference θ–π obtained by subtracting π from the phase difference θ of the soundproof structure body of each of Examples and Comparative Examples.

In Example 1, the distance L is changed, the absolute value $|\theta-\pi|$ of the difference is thus changed, and the maximum absorbance for the absolute value $|\theta-\pi|$ of the difference is plotted, which results in FIG. 23.

From FIG. 23, it can be seen that a high absorbance is obtained in a case of $\pi/3$ or less which satisfying the range of Inequation (1) of claim 1 of the present invention, that is, in a case where $|\theta-\pi|$ is equal to or smaller than $\pi/3$.

The absorbance of the single body resonance structure 14 (resonance type soundproof structure) is slightly lower than 0.5 illustrated by the alternate long and short dash line in FIG. 23. FIG. 23 also illustrates the maximum absorbance in a case where the resonance structure 14 (resonance type soundproof structure) is installed at the opening end portion.

Example 2

Figure 24:
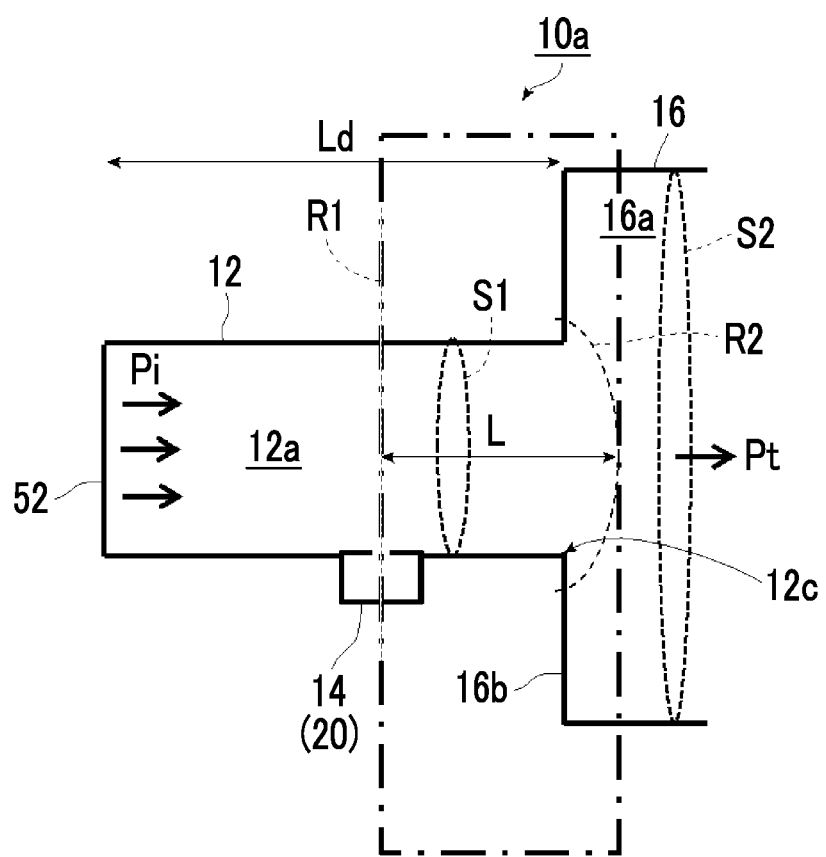
FIG. 24 is a cross-sectional schematic view conceptually illustrating an example of a soundproof structure body of Example 2.

A soundproof structure body 10a of Example 2 is illustrated in FIG. 24.

The soundproof structure body 10a illustrated in FIG. 24 includes the tube body 12 having a rigid reflection surface 52 at one end portion (incident side) and an opening portion 12c at the other end (emitting side), the Helmholtz resonance structure 20 as the resonance structure 14 installed on the wall surface of the tube body 12 on the portion 12c side, and the second tube body 16 connected to the opening portion 12c of the tube body 12.

The soundproof structure body 10a illustrated in FIG. 24 is the same as the soundproof structure body 10 illustrated in FIG. 1, which is used in Example 1, except that the length Ld of the tube body 12 is longer than that of the soundproof structure body 10, and one end portion (incident side) is formed of the rigid reflection surface 52. Thus, the same numerals are given to the same components, and the description will not be repeated.

Therefore, various parameters of the soundproof structure body 10a of Example 2 overlapped with those of Example 1, but the parameters were as follows.

Two kinds of lengths Ld of the tube body 12 is 150 mm and 200 mm.

A radius r1 of the opening tube line 12a of the tube body 12 is 30 [mm]

A cross-sectional area S1 of the opening tube line 12a of the tube body 12 is 2827 [mm$^2$]

A radius r2 of the tube line 16a of the second tube body 16 is 1000 [mm]

A cross-sectional area S2 of the tube line 16a of the second tube body 16 is $3.142\times10^6$ [mm$^2$].

Distance L0 between the resonance structure 14 (the center of the resonance hole 22 of the Helmholtz resonance structure 20: the reflection end 1 (R1)) and the opening portion 12c of the tube body 12 is 20 mm.

Distance L between the resonance structure 14 (the center of the resonance hole 22 of the Helmholtz resonance structure 20: the reflection end 1 (R1)) and the opening end after the opening end correction (the reflection end 2 (R2) after the correction) is 38 mm.

A cross-sectional area Sn of the resonance hole 22 (9.5 mm square) of the Helmholtz resonance structure 20a is 90.25 [mm$^2$].

A length lc of the resonance hole 22 of the Helmholtz resonance structure 20 is 5 [mm].

A volume Vc of the hollow space 24 of the Helmholtz resonance structure 20 is 4000 [mm$^3$].

Example 2-1

This is a case where the length Ld of the tube body 12 is 150 mm. Therefore, the waveguide of the tube body 12 is also 150 mm.

Figure 25:
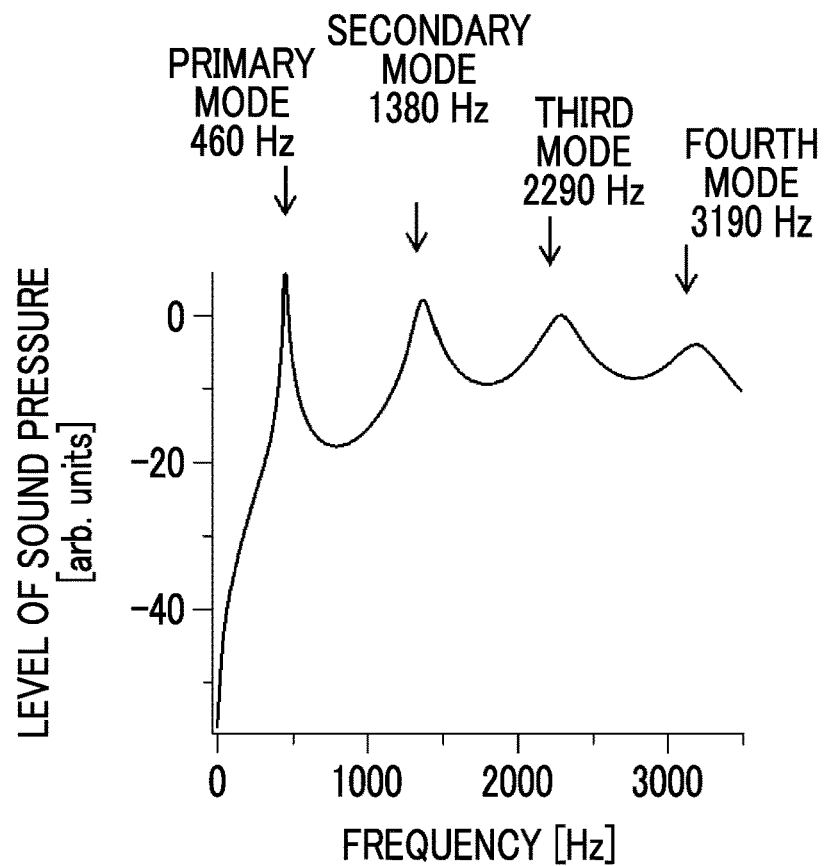
FIG. 25 is a graph illustrating a spectrum of sound pressure in a tube body of the soundproof structure body of Example 2-1.

FIG. 25 illustrates a spectrum of sound pressure in the tube body 12 of the soundproof structure body 10a of Example 2-1. That is, FIG. 25 illustrates a sound pressure mode of the soundproof structure body 10a in a case where there is no resonance structure 14 (resonance type soundproof structure).

From the spectrum of sound pressure illustrated in FIG. 20, a resonance frequency of a primary mode is 460 Hz, a resonance frequency of a secondary mode is 1380 Hz, a resonance frequency of a tertiary mode is 2290 Hz, and a resonance frequency of a quaternary mode is 3190 Hz. Therefore, a difference $\Delta f$ between resonance frequencies adjacent to each other is about 900 Hz ($\Delta f\approx900$ Hz).

On the other hand, since the resonance frequency fr of the resonance structure 14 (Helmholtz resonance structure 20) is 2180 Hz, Inequation (7) is satisfied, as illustrated below, with respect to the resonance frequency fn (n=3) of 2290 Hz in the tertiary mode illustrated in FIG. 25, and as a result, Inequation (7) of claim 7 of the present application is satisfied.

That is, 2290 Hz−900 Hz=2065/4<2180 Hz<2290 Hz+900 Hz/4=2515 is obtained.

Figure 26:
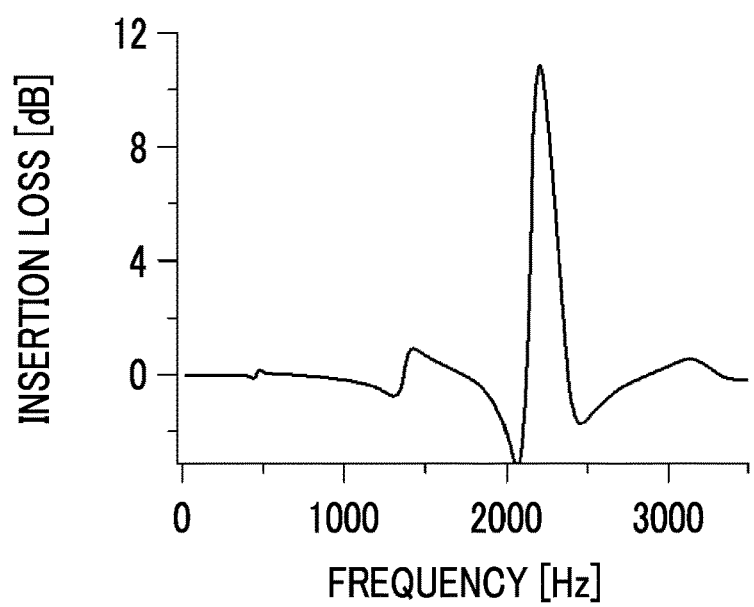
FIG. 26 is a graph illustrating an insertion loss of the soundproof structure body of Example 2-1.

FIG. 26 illustrates an insertion loss of the soundproof structure body 10a of Example 2-1.

As illustrated in FIG. 26, it can be seen that a high insertion loss of more than 10 dB can be obtained at a frequency of more than 2000 Hz to 2500 Hz, particularly near the resonance frequency fr=2180 Hz of the Helmholtz resonance structure 20.

Example 2-2

This is a case where the length Ld of the tube body 12 is 200 mm. Therefore, the waveguide of the tube body 12 is also 200 mm.

Figure 27:
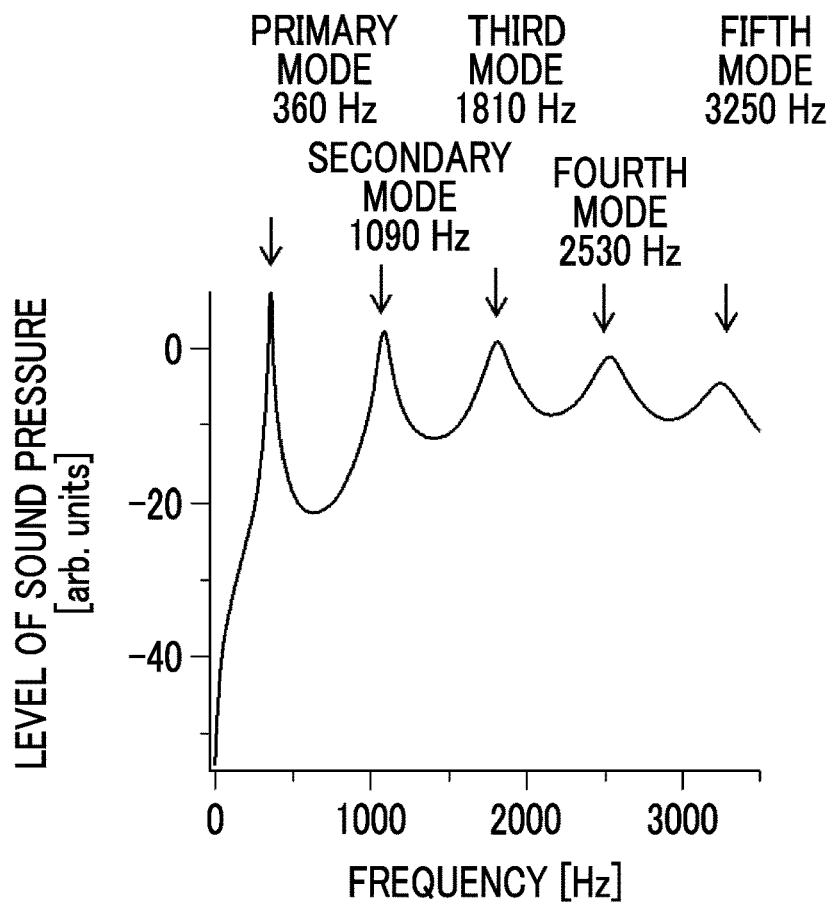
FIG. 27 is a graph illustrating a spectrum of sound pressure in a tube body of a soundproof structure body of Example 2-2.

FIG. 27 illustrates a spectrum of sound pressure in the tube body 12 of the soundproof structure body 10a of Example 2-2. That is, FIG. 27 illustrates a sound pressure mode of the soundproof structure body 10a in a case where there is no resonance structure 14 (resonance type soundproof structure).

From the spectrum of sound pressure illustrated in FIG. 20, a resonance frequency of a primary mode is 360 Hz, a resonance frequency of a secondary mode is 1090 Hz, a resonance frequency of a tertiary mode is 1810 Hz, a resonance frequency of a quaternary mode is 25300 Hz, and a resonance frequency of a fifth mode is 3520 Hz. Therefore, a difference Δf between resonance frequencies adjacent to each other is about 720 Hz (Δf≈720 Hz).

On the other hand, since the resonance frequency fr of the resonance structure 14 (Helmholtz resonance structure 20) is 2180 Hz, Inequation (7) is not satisfied, as illustrated below, with respect to the resonance frequency fn (n=3) of 1810 Hz in the tertiary mode illustrated in FIG. 27, and as a result, Inequation (7) of claim 7 of the present application is not satisfied.

That is, 1810 Hz−720 Hz/4=1630<1810 Hz+720 Hz/4=2515<2180 Hz is obtained.

Figure 28:
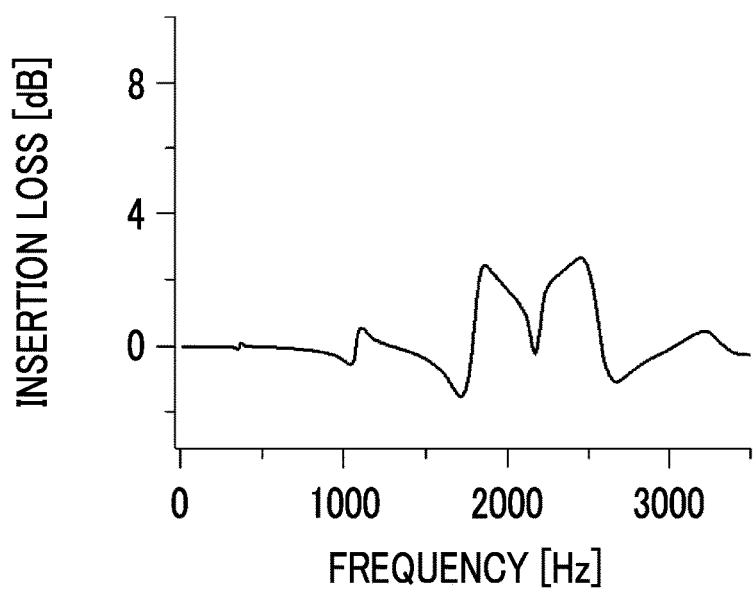
FIG. 28 is a graph illustrating an insertion loss of the soundproof structure body of Example 2-2.

FIG. 28 illustrates an insertion loss of the soundproof structure body 10a of Example 2-2.

As illustrated in FIG. 28, it can be seen that in the soundproof structure body 10a of Example 2-2, an insertion loss of about 3 dB could be obtained although the insertion loss is low at a frequency of 1800 Hz to 2200 Hz and a frequency of 2300 Hz to 3200 Hz.

According to the above, in a case of comparing Example 2-1 that satisfies claim 7 of the present application with Example 2-2 that does not satisfy claim 7 of the present application, it can be seen that the case of Example 2-1 that satisfies claim 7 of the present application has a larger insertion loss than the case of Example 2-2 that does not satisfy claim 7 of the present application.

According to the above, the effect of the present invention is clearly exhibited.

As above, the soundproof structure body according to the embodiment of the present invention has been described in detail with reference to various embodiments and examples, but the present invention is not limited to these embodiments and examples, and it goes without saying that various improvements and modifications may be made without departing from the spirit of the present invention.

EXPLANATION OF REFERENCES 10, 10a, 11: soundproof structure body
12, 16: tube body
12a: opening tube line
12b, 12c: opening portion
14: resonance structure (resonance type soundproof structure)
16a: tube line
16b: end surface
20: Helmholtz resonance structure
22: resonance hole
24: hollow space
26: housing
30: film resonance structure
32: frame
33a: surrounding portion
33b: bottom portion
34: hole portion
36: film
38: back space
40: air column resonance structure
42: opening
44: bottom surface
46: tubular body
50: fan
52: rigid reflection surface

What is claimed is:

1. A soundproof structure body comprising:
a tubular tube body having an opening portion; and
a resonance type soundproof structure formed from an air impermeable material and directly installed on a wall surface of the tube body,
wherein the resonance type soundproof structure has a portion that is in direct contact with an inside of the tube body,
wherein a phase difference θ, at an upstream of the resonance type soundproof structure, between a reflected wave in the resonance type soundproof structure and a reflected wave of a transmitted wave transmitted through the resonance type soundproof structure and reflected by the opening portion satisfies the following Inequation (1) with respect to a resonance frequency of the resonance type soundproof structure.

$$|\theta - \pi| \leq \pi/3 \tag{1}$$

2. The soundproof structure body according to claim 1, wherein an absorbance of the resonance type soundproof structure at a single resonance type soundproof structure in a waveguide composed of an opening tube line through which a sound wave travels in the tube body is larger than a reflectance.

3. The soundproof structure body according to claim 1, wherein in a case where a waveguide distance from the resonance type soundproof structure to the opening portion of the tube body in a waveguide composed of an opening tube line through which a sound wave travels in the tube body, which includes an opening end correction, is denoted by L, an average cross-sectional area of the waveguide included in the tube body is denoted by S1, and a reflectance obtained by the opening end is denoted by Rx(f), an acoustic impedance Z1 defined by Expression (3) satisfies Expression (2) on a complex plane in a frequency range in which a frequency f satisfies f<c/(4×(√(S1/π))), $$|(Z1-Z0)/(Z1+Z0)| < \sqrt{Rx(f)} \tag{2}$$

$$Z1 = (A \times Z0 + B)/(C \times Z0 + D) \tag{3},$$

A, B, C, and D are given by Expression (4) representing a transfer matrix T, $$T = \begin{pmatrix} A & B \\ C & D \end{pmatrix} = \begin{pmatrix} 1 & 0 \\ \frac{1}{Z_R} & 1 \end{pmatrix} \begin{pmatrix} \cos kL & iZ_0 \sin kL \\ \frac{i}{Z_0} \sin kL & \cos kL \end{pmatrix} \begin{pmatrix} 1 & 0 \\ 0 & \frac{S_X}{S_I} \end{pmatrix} \tag{4}$$

Z0 is given by Expression (5), $$Z0 = \rho c / S1 \tag{5},$$

Sx is given by Expression (6), $$Sx = (1 + Rx(f))/(1 - Rx(f)) \times S1 \tag{6, and}$$

$Z_R$ is an impedance of the resonance type soundproof structure, c is a speed of sound, ρ is a density of air, and k is a wave number.

4. The soundproof structure body according to claim 1, wherein an outlet side interface of the tube body is regarded as an open space.

5. The soundproof structure body according to claim 1, further comprising at least one resonance type soundproof structure in addition to the resonance type soundproof structure.

6. The soundproof structure body according to claim 1, wherein the resonance type soundproof structure is disposed within λ/4 from the opening portion.

7. The soundproof structure body according to claim 1, wherein the tube body includes a noise source, and in a case where a resonance frequency of the tube body including the noise source is denoted by fn (n is a resonance frequency, and a positive integer), and a difference between adjacent resonance frequencies of the tube body including the noise source is denoted by Δf, a resonance frequency fr of the resonance type soundproof structure satisfies Expression (7), $$fn - \Delta f/4 < fr < fn + \Delta f/4 \quad (7).$$

8. The soundproof structure body according to claim 7, wherein the resonance frequency fr of the resonance type soundproof structure and the resonance frequency fn of the tube body including the noise source coincide with each other.

9. The soundproof structure body according to claim 7, wherein the noise source is a fan.

10. The soundproof structure body according to claim 7, wherein a peak frequency of a noise spectrum of the noise source and the resonance frequency of the resonance type soundproof structure coincide with each other.

11. The soundproof structure body according to claim 1, wherein the tube body further includes at least one opening portion in addition to the opening portion.

12. The soundproof structure body according to claim 1, wherein the resonance type soundproof structure is a film resonance body, a Helmholtz resonance body, or an air column resonance body.

13. The soundproof structure body according to claim 2, wherein in a case where the waveguide distance from the resonance type soundproof structure to the opening portion of the tube body, which includes an opening end correction, is denoted by L, an average cross-sectional area of the waveguide included in the tube body is denoted by S1, and a reflectance obtained by the opening end is denoted by Rx(f), an acoustic impedance Z1 defined by Expression (3) satisfies Expression (2) on a complex plane in a frequency range in which a frequency f satisfies $f < c/(4 \times (\sqrt{(S1/\pi)}))$, $$|(Z1-Z0)/(Z1+Z0)| < \sqrt[4]{Rx(f)} \quad (2)$$

$$Z1 = (A \times Z0 + B)/(C \times Z0 + D) \quad (3),$$

A, B, C, and D are given by Expression (4) representing a transfer matrix T, $$T = \begin{pmatrix} A & B \\ C & D \end{pmatrix} = \begin{pmatrix} 1 & 0 \\ \frac{1}{Z_R} & 1 \end{pmatrix} \begin{pmatrix} \cos kL & iZ_0 \sin kL \\ \frac{i}{Z_0} \sin kL & \cos kL \end{pmatrix} \begin{pmatrix} 1 & 0 \\ 0 & \frac{S_X}{S_I} \end{pmatrix} \quad (4)$$

Z0 is given by Expression (5), $$Z0 = \rho c/S1 \quad (5),$$

Sx is given by Expression (6), $$Sx = (1 + Rx(f))/(1 - Rx(f)) \times S1 \quad (6), \text{ and}$$

$Z_R$ is an impedance of the resonance type soundproof structure, c is a speed of sound, ρ is a density of air, and k is a wave number.

14. The soundproof structure body according to claim 2, wherein an outlet side interface of the tube body is regarded as an open space.

15. The soundproof structure body according to claim 2, further comprising at least one resonance type soundproof structure in addition to the resonance type soundproof structure.

16. The soundproof structure body according to claim 2, wherein the resonance type soundproof structure is disposed within λ/4 from the opening portion.

17. The soundproof structure body according to claim 2, wherein the tube body includes a noise source, and in a case where a resonance frequency of the tube body including the noise source is denoted by fn (n is a resonance frequency, and a positive integer), and a difference between adjacent resonance frequencies of the tube body including the noise source is denoted by Δf, a resonance frequency fr of the resonance type soundproof structure satisfies Expression (7), $$fn - \Delta f/4 < fr < fn + \Delta f/4 \quad (7).$$

18. The soundproof structure body according to claim 17, wherein the resonance frequency fr of the resonance type soundproof structure and the resonance frequency fn of the tube body including the noise source coincide with each other.

19. The soundproof structure body according to claim 17, wherein the noise source is a fan.

20. The soundproof structure body according to claim 17, wherein a peak frequency of a noise spectrum of the noise source and the resonance frequency of the resonance type soundproof structure coincide with each other.

21. The soundproof structure body according to claim 1, wherein the air impermeable material is a hard material that has a strength suitable in a case of being applied to a soundproofing target and is resistant to a soundproof environment of the soundproofing target.

22. The soundproof structure body according to claim 1, wherein the air impermeable material is a metal material selected from aluminum, titanium, magnesium, tungsten, iron, steel, chromium, chromium molybdenum, nichrome molybdenum, and an alloy thereof, or a resin material selected from an acrylic resin, polymethyl methacrylate, polycarbonate, polyamideimide, polyarylate, polyetherimide, polyacetal, polyether ether ketone, polyphenylene sulfide, polysulfone, polyethylene terephthalate, polybutylene terephthalate, polyimide, and triacetyl cellulose, carbon fiber reinforced plastic (CFRP), carbon fiber, or glass fiber reinforced plastic (GFRP).

23. The soundproof structure body according to claim 1, wherein the resonance type soundproof structure is a Helmholtz resonance structure, a film resonance structure, or an air column resonance structure, and
a resonance hole of the Helmholtz resonance structure, a film surface of the film resonance structure, or an opening of the air column resonance structure is the portion that is in direct contact with the inside of the tube body.

* * * * *